United States Patent

[11] 3,595,021

| [72] | Inventor | Roger Henri Tissier<br>Paris, France |
|---|---|---|
| [21] | Appl. No. | 864,306 |
| [22] | Filed | Oct. 7, 1969 |
| [45] | Patented | July 27, 1971 |
| [73] | Assignee | Societe Nationale D'Etude Et De<br>Construction De Moteurs D'Aviation<br>Paris, France |
| [32] | Priority | Oct. 10, 1968, Sept. 15, 1969 |
| [33] | | France |
| [31] | | 169,476 and 6,931,271 |

[54] FUEL FEED SYSTEM FOR REHEAT-COMBUSTION IN GAS TURBINE POWER PLANTS
25 Claims, 21 Drawing Figs.

[52] U.S. Cl. .................................................. 60/243,
60/39.28
[51] Int. Cl. ................................................... F02k 3/10
[50] Field of Search .......................................... 60/39.28,
242, 243, 233, 235, 39.09

[56] References Cited
UNITED STATES PATENTS

| 3,106,934 | 10/1963 | Rogers | 60/39.28 X |
| 3,141,298 | 7/1964 | Simpson | 60/39.28 |
| 3,197,958 | 8/1965 | Davies | 60/39.28 X |
| 3,199,290 | 8/1965 | Jubb | 60/39.28 |
| 3,270,500 | 9/1966 | Williams | 60/39.28 X |

*Primary Examiner*—Clarence R. Gordon
*Attorney*—William J. Daniel

ABSTRACT: A fuel feed system for the reheat combustion chamber of a gas turbine power plant, comprising a reheat combustion fuel pump, at least one fuel injector for such reheat combustion chamber, a fuel-metering device in a feed line from said pump to said injector or injectors, a fuel bypass means connected to bypass said metering device, and a shutoff device for closing the bypass means when the pressure of fuel prevailing in the injector or injectors exceeds a predetermined value.

FIG.: 4

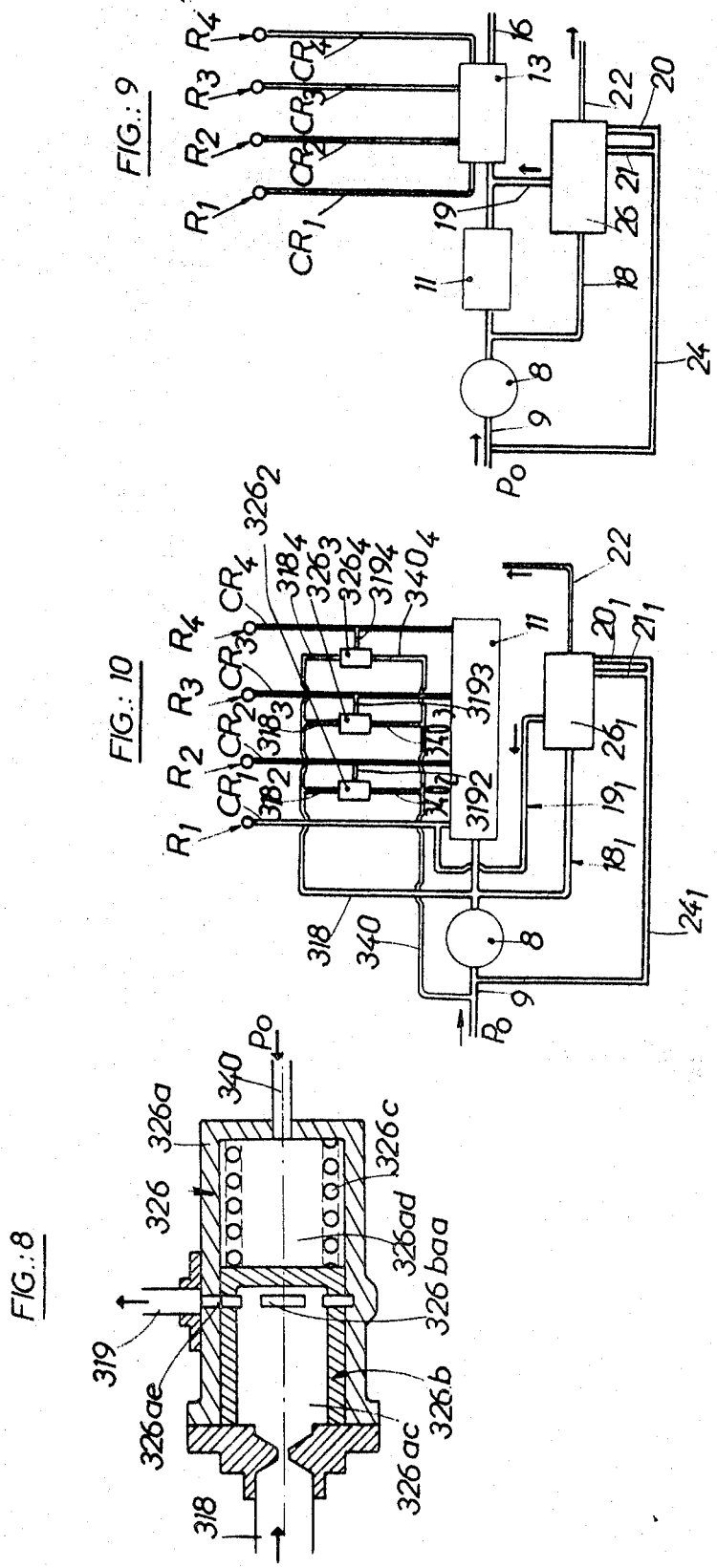

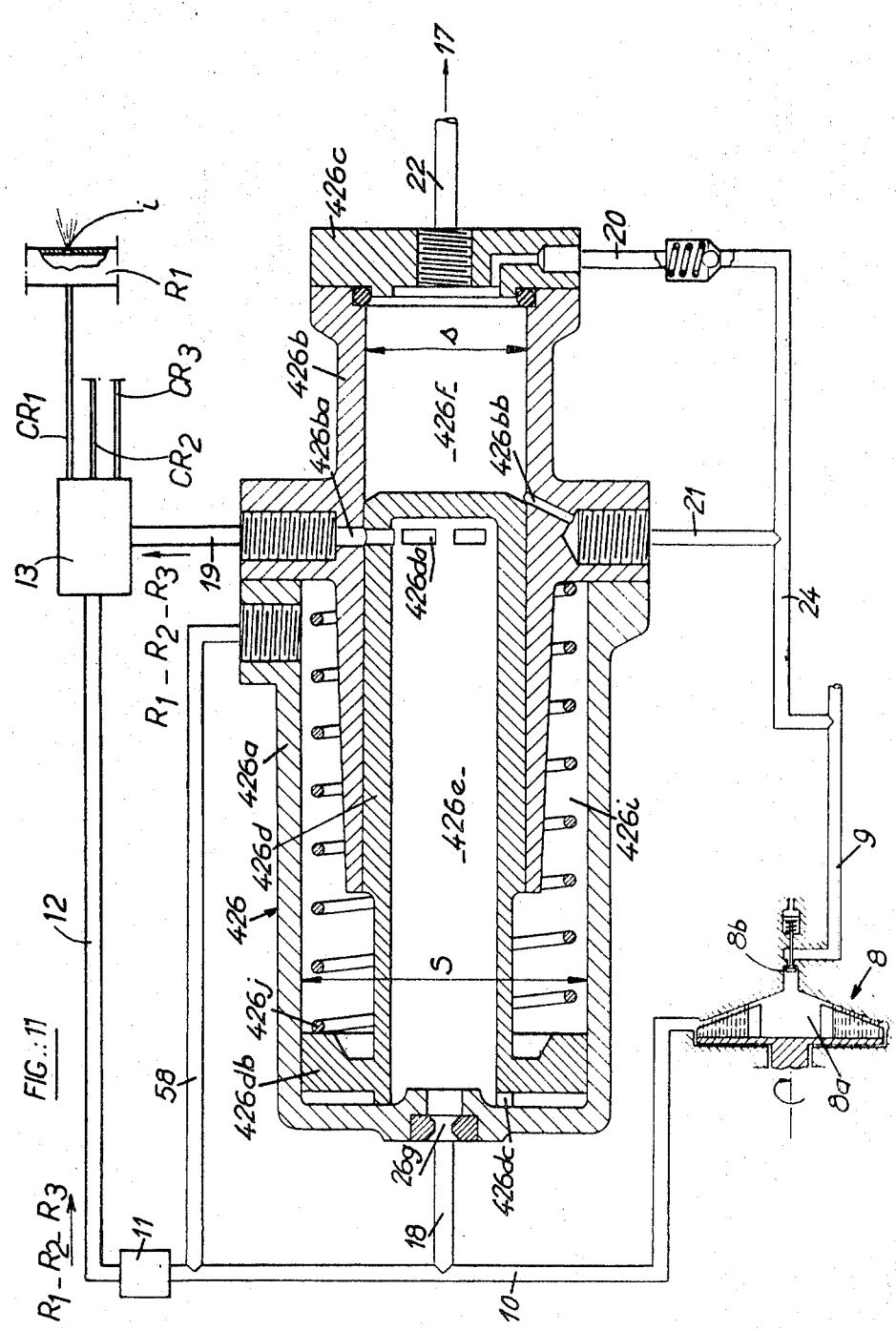

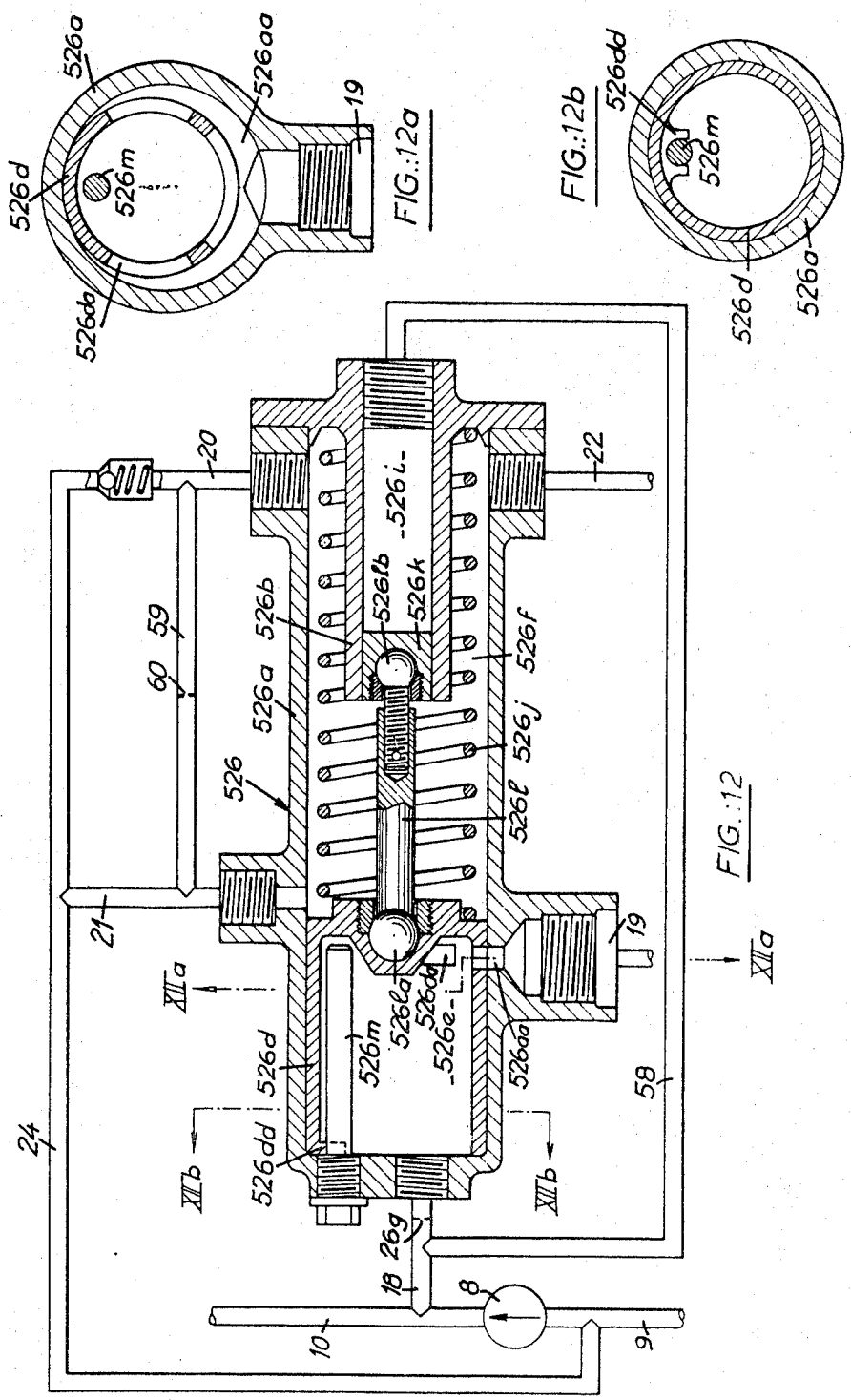

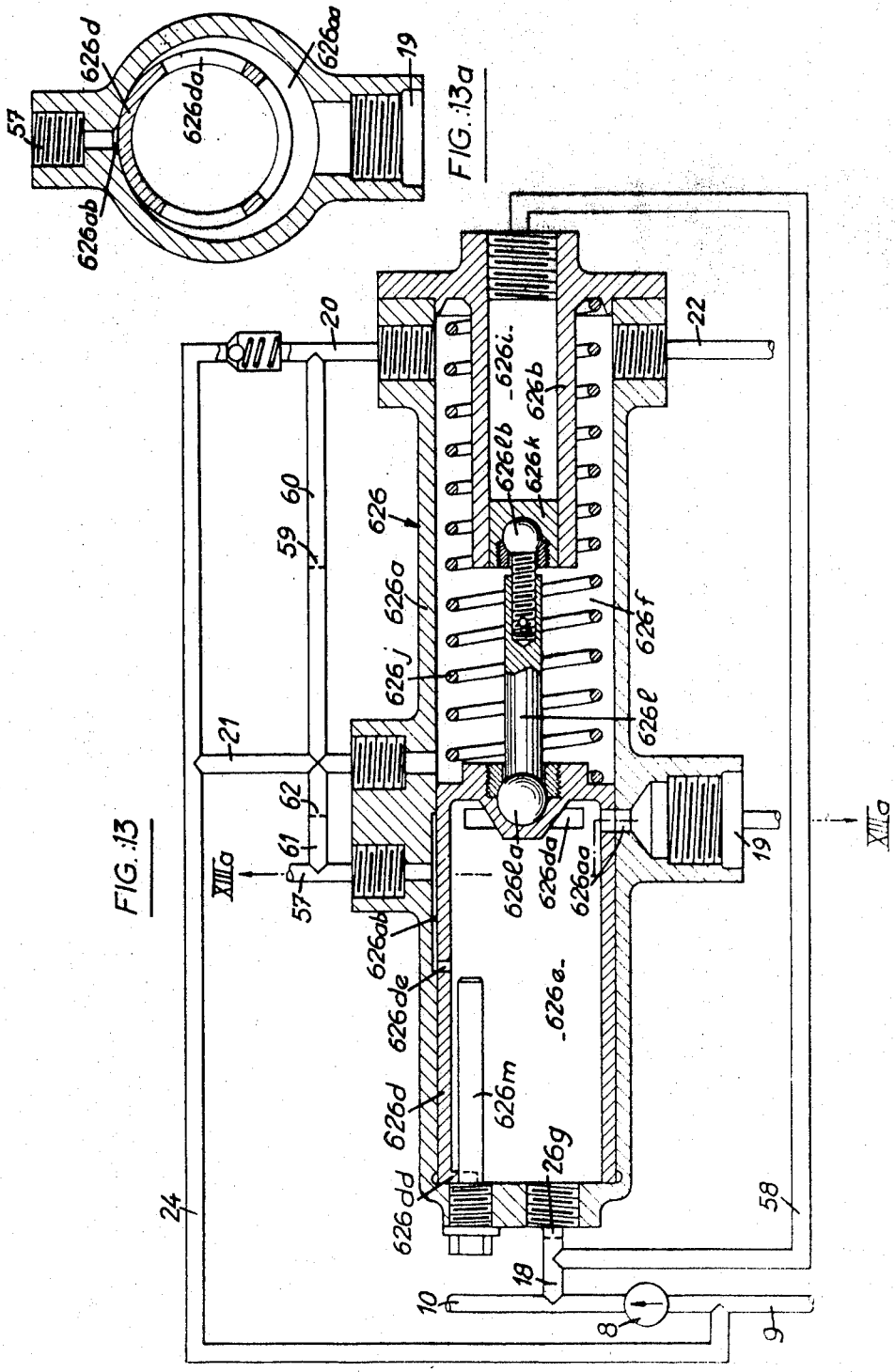

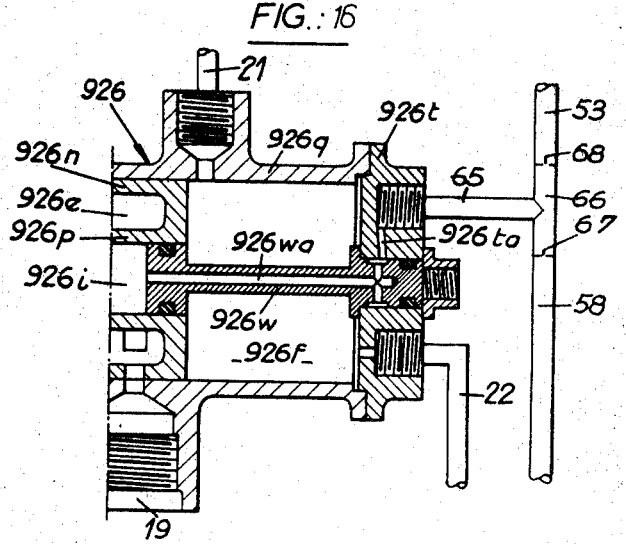
FIG.: 16
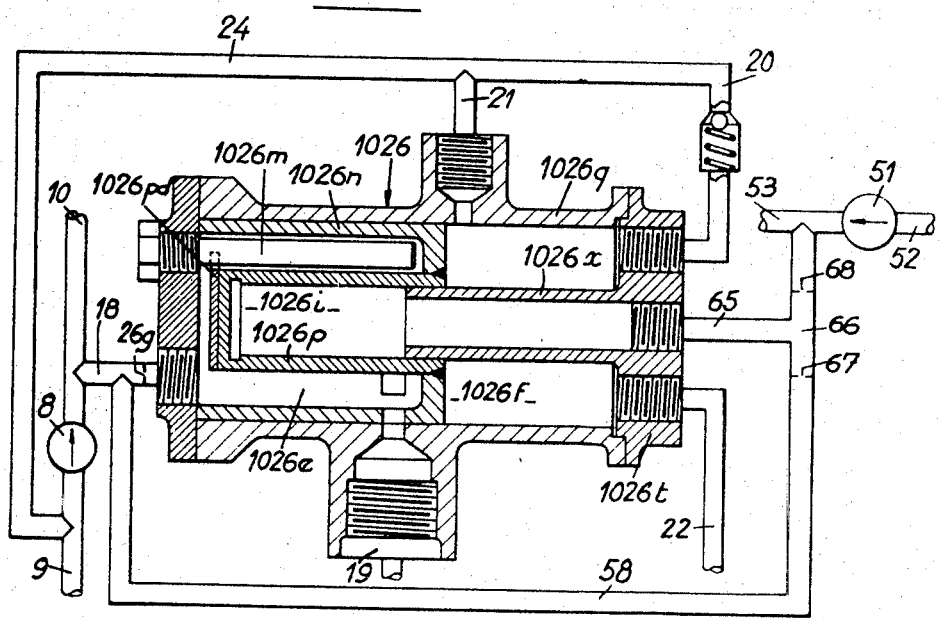
FIG.: 17

3,595,021

FUEL FEED SYSTEM FOR REHEAT-COMBUSTION IN GAS TURBINE POWER PLANTS

This invention relates generally to a gas turbine power plant, such as a turbojet engine, including a reheat combustion chamber disposed downstream of the turbine, and relates in particular to a fuel feed system allowing improved programming of the ignition phase of reheat combustion in a power plant of this kind.

In the case of a turbojet engine comprising, upstream of the reheat combustion chamber, a turbine preceded by a main combustion chamber, it is known to effect ignition of the reheat combustion by injection of a supplementary amount of fuel into said main combustion chamber for a certain period of time, generally through an auxiliary ignition injector having its outlet, for example, slightly upstream of the turbine. The resulting ignited jet traverses the turbine to ignite the fuel injected into the reheat combustion chamber.

This method, which has the advantage of simplicity, nevertheless presents the drawback of temporarily causing a supplementary rise in the temperature of the turbine blades, which temperature, in normal operation, is already very high in modern engines. In order to reduce this supplementary rise in temperature to the minimum, it is therefore advisable to limit both the flow and the duration of injection of the fuel through the auxiliary ignition injector.

It is moreover necessary to observe that, before the reheat combustion is put into action, the reheat combustion fuel injector or injectors or multijet injection rack or racks are substantially empty of fuel: in fact, under "dry" working conditions, that is to say without reheat combustion, provision is often made for clearing these injectors of the fuel they contain, in particular so as to avoid the appearance of harmful carbonization phenomena, and air scavenging is generally used for this purpose; the absence of fuel in the injectors or injection racks may also be a consequence, more simply, of the vaporization thereof under the influence of the existent high temperature. The injectors or multijet racks being empty, a certain time therefore elapses between the instant when the control lever of the jet engine is placed in the "reheat combustion" position and the instant when the actual injection of the fuel into the reheat combustion chamber begins, the delay in the injection being all the greater the higher the capacity of the injectors or multijet injection racks and their feed pipes. When these injectors are constituted by multijet injection racks, for example annular injection racks, of large capacity, the delay in the injection may thus be considerable.

Owing to the fact that the injection of fuel through the auxiliary ignition injector is generally initiated by putting the control lever of the jet engine into the "reheat combustion" position, the actual ignition of the reheat combustion can be effected only from the instant when at least one of the reheat-combustion injectors or multijet injection racks is completely filled with fuel, which means that the auxiliary ignition injector must discharge at least until that instant. At high altitude, where the slow-running flow of the reheat combustion fuel is small and where, consequently, the time for filling the reheat combustion injectors or multijet injection racks is long, the duration of injection of the fuel through the auxiliary ignition injector may therefore be very considerable, of the order of several seconds for some engines, with the drawback hereinbefore mentioned, even if temporary, which the injection of such an excess of fuel entails for the turbine.

It is true that more or less complex devices have been conceived for obviating this drawback, the function thereof consisting in initiating the auxiliary ignition injection only when at least one of the reheat-combustion injectors or multijet injection racks is completely filled. In this way, the duration of the spray of fuel through the auxiliary ignition injector is reduced, but the delay in the actual ignition of the reheat combustion is not thereby reduced nevertheless, since in any case it is necessary to wait for the reheat combustion injector or multijet injection rack to fill completely, which, as can be imagined, may constitute a serious drawback from the point of view of the performance of a machine propelled by such a turbojet engine.

The object of the invention is to permit the programming of the ignition phase of the reheat combustion without the aforesaid disadvantages arising and to obtain actual ignition of the reheat combustion in a practically instantaneous manner as soon as the control lever of the jet engine is placed in the "reheat combustion" position.

The invention starts from a feed system comprising a reheat combustion fuel pump, at least one fuel injector or multijet fuel injection rack in the reheat combustion chamber, a feed pipe interconnecting said pump and said injector or multijet injection rack and in which there is interposed a metering device for the flow of reheat-combustion fuel, branch pipe means connected in parallel to said pipe and bypassing said flow-metering device, and a shutoff device for said branch pipe means.

According to the invention, the shutoff device to which reference has just been made comprises a valve element rigid with a movable body subjected, in one direction, to the action of the pressure of the fuel prevailing in the injector or multijet injection rack and, in the other direction, to the action of a restoring force, said body being movable to cause the closing of the branch pipe means when said pressure exceeds a value determined by said restoring force.

According to a preferred constructional form, on movement of the movable body under the action of the pressure of the fuel prevailing in the injector or multijet injection rack, said movable body controls an ignition device for the fuel injected into the reheat combustion chamber from said injector or tube. Such an arrangement is specially advantageous because it permits precise programming of the ignition stage of the reheat combustion from the instant when the control lever of the jet engine is placed in the "reheat combustion" position to the instant when the ignition of the injected fuel is effective, by passing through the intermediate stage of the accelerated prefilling.

The ignition device for the fuel injected into the reheat combustion chamber may be of the type referred to hereinbefore, which comprises a device for injecting a spray of fuel through at least one auxiliary ignition injector opening, for example, into the main combustion chamber of the jet engine upstream of the turbine.

According to one arrangement in accordance with the invention, such an injection device may comprise an injection pump of the piston and cylinder type fed with fuel through the medium of an inlet conduit and delivering said fuel through the auxiliary ignition injector, the movable member (piston or cylinder) of the pump being integral with the movable body of the shutoff device associated with the branch pipe means bypassing the flow-metering device. The inlet conduit of this injection pump may advantageously be connected to the suction side of the reheat-combustion fuel pump.

According to a particularly advantageous arrangement, the ignition-fuel injection pump comprises means for returning or bypassing the fuel which it delivers towards its inlet conduit during a first portion of the delivery stroke of its movable member, corresponding to the stroke which the movable body must perform for the branch pipe means shutoff device to be completely closed, so that said fuel may not be supplied through the ignition injector at the precise instant when the reheat-combustion injector or tube is completely filled, but with a slight delay. In fact, at the precise instant to which reference has just been made, the fuel pressure in the reheat combustion injector or the tube increases sharply, as it is no longer air but fuel which begins to escape therefrom. During or a short period of time before the branch pipe means is closed, it may therefore happen that the flow of fuel injected into the reheat combustion chamber is abnormally high, so that the richness of the fuel mixture in said chamber could reach too high a value, which is incompatible with correct ignition. The arrangement according to the invention therefore enables actual ignition to be delayed until the moment when said richness has returned to a normal value.

The means used for returning or bypassing the ignition fuel towards the inlet conduit of the injection pump may advantageously comprise a transverse passage formed through the sidewall of the cylinder of said pump and in communication with the inlet conduit of said pump during the first part of the delivery stroke of its movable member (piston or cylinder), said communication being interrupted as soon as the movable member has passed beyond the location of said transverse passage during its relative movement with respect to the stationary member. It will therefore be understood that it is possible in this way to synchronize the moment when the ignition fuel ceases to be returned towards the inlet conduit of the injection pump with the moment when the branch pipe bypassing the flow metering device is completely closed.

The movable body and the injection pump referred to hereinbefore may advantageously cooperate with a relay injector opening into the reheat combustion chamber and fed with fuel through the medium of a relay pipe equipped with a closing element rigid with the movable body, said closing element being arranged in such manner as to cause the closing of the relay pipe during at least at the end of the delivery stroke of the movable member of the injection pump. Preferably, this relay injector is fed with fuel taken from the branch pipe means upstream of the shutoff device.

According to a variant of the invention, instead of an injection pump, it is also possible to use an electric valve inserted in a fuel feed pipe for the ignition injector and forming part of an electric circuit which also comprises a contactor, said contactor being controlled by the movable body in the course of its movement under the action of the pressure of the fuel in the branch pipe means in such manner as to permit the energization of the electric valve in the direction of opening thereof.

In the last case, in order to stop the injection of ignition fuel, it is possible to use with advantage a switch inserted in the electric circuit and operated in the direction of opening either by a timing device, after a given lapse of time, or by an ignition detector projecting into the reheat combustion chamber.

Instead of the ignition of the reheat combustion being effected by injection of a spray of fuel through an auxiliary ignition injector, it could also be produced by means of an electric igniter, for example of the spark of incandescent filament type, it being possible for such an igniter to be inserted in an electric circuit similar to that to which reference has just been made.

In the case where the reheat combustion chamber is equipped with several reheat combustion injectors or multijet injection racks having accelerated prefilling, an individual branchpipe means may be associated with each of at least some of said injectors. The accelerated prefilling device of one of said injectors may them comprise a movable body controlling, under the action of the pressure of the fuel in said injector or injection rack an ignition device for the fuel injected into the reheat combustion chamber.

According to a modified constructional form, an accelerated prefilling device may be provided for feeding a plurality of injectors or multijet injection rack at a time, said device comprising in particular a common branchpipe means. As before, the latter may be associated with a movable body controlling an ignition device for the fuel injected into the reheat combustion chamber.

The restoring force to which the movable body is subjected by be afforded by a spring mounted, for example, outside the injection pump. In some cases, however, it will be apparent that the use of a spring is not without drawbacks. In effect, this spring must be able to accept considerable deformation (in particular in the case where the movable body which has just been mentioned serves at the same time to actuate an ignition-fuel injection pump), while having a stiffness compatible with the filling pressure of the injectors or multijet injection racks, which pressure may be high in the case of certain machines. It is therefore necessary to give the spring relatively large dimensions which results, as regards the whole programming device, in a weight and overall dimensions which may be prohibitive.

Moreover, a spring has the disadvantage of defining for the movable body a starting pressure which is always the same whatever the operating conditions of the engine. However, according to the altitude at which the ignition of the reheat combustion is effected and, taking account of the fact that, all things being otherwise equal, the flow of fuel supplied by the reheat combustion pump generally varies in inverse ratio to the altitude, the pressure at the end of the filling of the multijet injection rack may exhibit rather different values.

It may therefore be advantageous to have a variable bias available for initiating the movement of the movable body, and not a fixed bias as defined by a spring.

To this end, according to another aspect of the invention, the restoring force to which the movable body is subjected is provided, at least partially, by the action of a reference pressure which is a function of the flow of fuel delivered by the reheat combustion fuel pump.

According to one constructional form, this reference pressure is the pressure prevailing on the delivery side of the reheat combustion fuel pump. A According to another constructional form applicable to the case where the plant comprises a pump (a so-called "dry" pump) for feeding fuel to a main combustion chamber located upstream of the turbine, the reference pressure is taken from a circuit communicating with the delivery side of the reheat combustion fuel pump through the intermediary of a first construction and with the delivery side of said "dry" pump through the medium of a second constriction. The reference pressure thus has a value intermediate between the delivery pressures of the two pumps. In some cases, the new parameter introduced in this way enables the reference pressure to be adjusted to requirements with greater precision. Moreover, without it being necessary to resort to a device such as a resetting spring, the delivery pressure of the "dry" pump keeps the device always ready to operate for ensuring the programming of the ignition of the reheat combustion.

The description which follows with reference to the accompanying drawings is given by way of nonlimitative example to make it clearly understood how the invention can be carried into practice.

In the Drawings:

FIG. 1 is a diagrammatic view, in partial longitudinal section, of a reheat-combustion turbojet engine equipped with a device according to the invention for programming the ignition stage of the reheat combustion, said device cooperating with an auxiliary ignition injector;

FIGS. 2, 3, 4 show on a larger scale, in longitudinal section, a first constructional form of a programming device according to the invention, in the configuration of operation without reheat combustion, in the configuration at the end of the accelerated prefilling of a reheat combustion injector or multijet injection rack, corresponding to the beginning of the injection of ignition fuel through an auxiliary injector, and finally in the configuration of operation with reheat combustion, respectively;

FIG. 8 is a longitudinal sectional view of a simplified version of a programming device according to the invention comprising only a device for the accelerated prefilling of a reheat-combustion injector or multijet injection rack;

FIGS. 9 and 10 are diagrammatic views showing two possible ways of setting up programming devices according to the invention in the case of a turbojet engine provided with a plurality of reheat combustion injectors or multijet injection racks;

FIGS. 11 to 17 are diagrammatic views in longitudinal section respectively showing other constructional forms of a programming device according to the invention, in which the programming is influenced by a reference pressure variable as a function of the flow of fuel supplied by the reheat combustion pump;

FIGS. 12a and 12b are sectional views taken on the lines XIIa–XIIBa and XIIb–XIIb, respectively, of FIG. 12; and FIG. 13a is a sectional view taken on the line XIIIa–XIIIa of FIG. 13.

Figure 1:
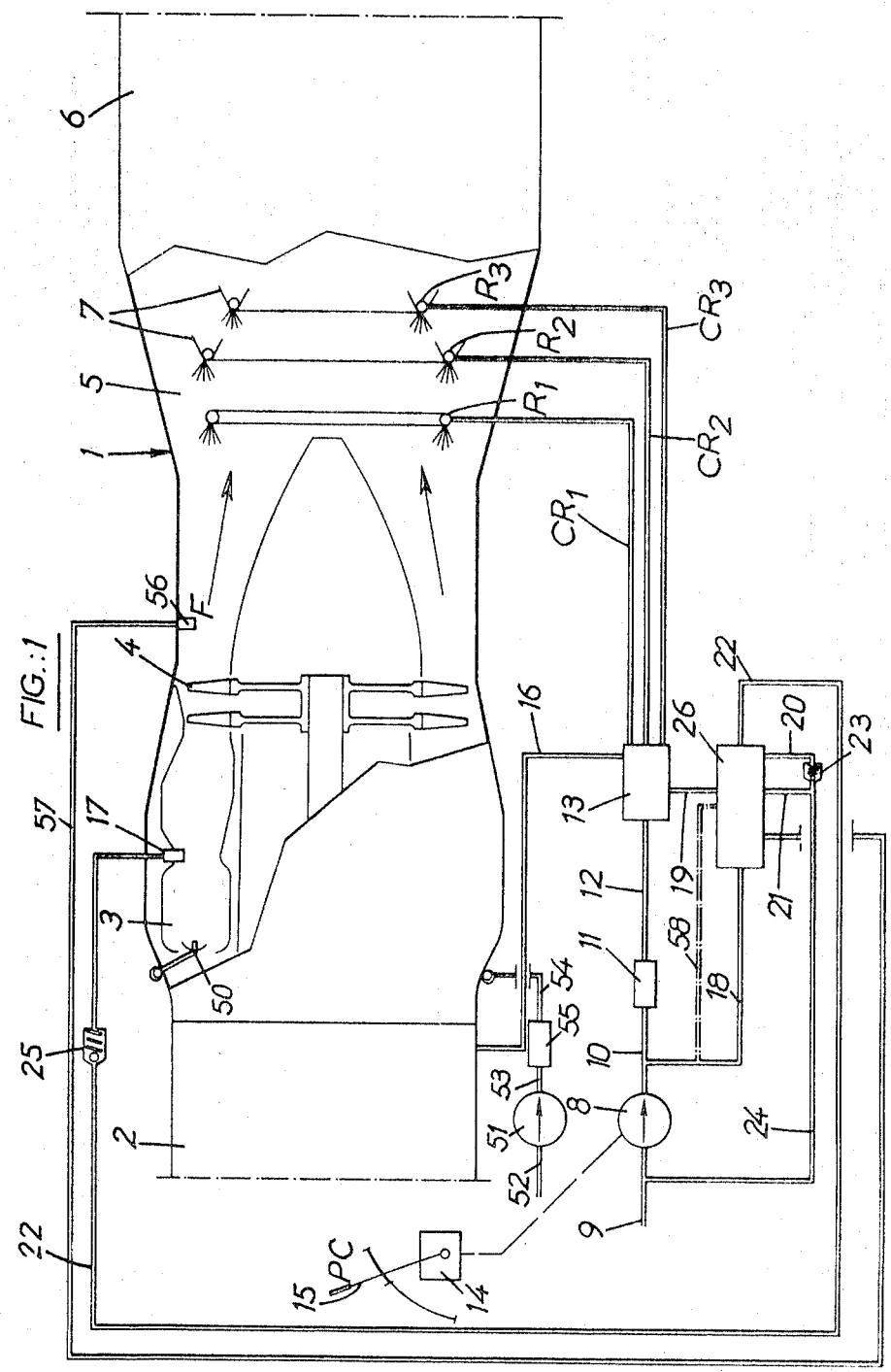

Referring to FIG. 1, the general reference 1 designates a gas turbine power plant, in this case a turbojet engine, equipped with an improved fuel feed system in accordance with the invention. This turbojet engine, which is designed to propel a machine, such as an aircraft, at high speed, comprises, following an air intake (not shown), a compressor 2, a main combustion chamber 3, a turbine 4, a reheat combustion chamber 5 and an exhaust duct terminating in a nozzle (also not shown).

Main injectors 50 open into the combustion chamber 3. A pump 51 fed with fuel through a suction pipe 52 from a source (not shown in the drawing), delivers the fuel to the injectors 50 through delivery pipes 53, 54 between which a conventional flow metering device 55 is interposed.

Mounted in the reheat combustion chamber are reheat combustion injectors or multijet injection racks which can inject a metered supply of fuel in countercurrent to the flow of hot gases, symbolized by the arrow F, escaping from the turbine 4. These multijet injection racks may have a generally annular form and can be mounted, as regards at least some of them, such as the multijet injection racks $R_2$, $R_3$, in flame-stabilizing rings 7 of V-shaped cross section, said rings being provided at the point of the V With orifices permitting the passage of the fuel escaping from said injection racks; the multijet injection rack $R_1$ which is disposed upstream of the others, and is devoid of a flame-stabilizing ring in the example shown, performs the function of a pilot combustion multijet injection rack in the reheat combustion chamber.

The injectors or multijet injection racks $R_1$, $R_2$, $R_3$ ... are fed with fuel from a common source comprising in particular a high-delivery pump 8, a suction pipe of which is designated by the reference 9. The fuel supplied by the pump 8 passes in succession through a pipe 10, a metering device 11 forming part of a regulating system, a pipe 12 and a distributor and blow-off device 13 from which there start pipes $CR_1$, $CR_2$, $CR_3$,... arranged in parallel and connected to the injectors or multijet injection racks $R_1$, $R_2$, $R_3$... respectively. Each of the injectors or multijet injection racks is thus connected to the fuel source 8 through the medium of a feed pipe (such as 10, 12, $CR_1$ for the tube injection rack $R_1$) in which there is inserted a flow-metering device, in the present case the metering device 11 which is common to the assembly of multijet injection racks. A device for setting the reheat combustion in operation is designated by the reference 14. This device includes in particular a control lever 15 which, when it reaches the "reheat combustion" position, causes the starting of the pump 8.

The metering device 11 may be of conventional construction and enables the flow of fuel actually injected through the multijet injection racks $R_1$, $R_2$, $R_3$... to be metered in known manner within wide limits as a function of certain parameters of the jet engine and/or of the surrounding atmosphere. As regards the distributor and blow-off device 13, this has the function, on the one hand, of distributing the fuel between the various multijet injection racks when the jet engine is in the reheat combustion configuration and, on the other hand, of permitting the clearing of said injection racks by air scavenging after the reheat combustion has been extinguished. The reference 16 designates a pipe for compressed air intended to clear the tubes, it being possible for this air to be drawn in known manner from the compressor of the jet engine.

On putting reheat combustion into operation, an auxiliary ignition injector 17 opening into the main combustion chamber 3 of the jet engine enables a supplementary amount of fuel to be delivered for a certain period of time upstream of the turbine 4. This supplementary amount of fuel ignites by reason of the high temperature prevailing in the chamber 3 and thus produces a tongue of flame which passes through the blades of the turbine 4 to ignite the reheat combustion fuel escaping, in particular, from the upstream injector or multijet injection rack $R_1$.

A supplementary auxiliary injector, a so-called relay injector, fed from a relay pipe 57, may also be provided for temporarily introducing a certain amount of fuel a little downstream of the turbine for the purpose of lengthening the tongue of flame coming from the injector 17, thus further facilitating the ignition of the reheat combustion fuel.

In operation without reheat combustion, the injectors or multijet injection racks $R_1$, $R_2$, $R_3$ ... are swept by a stream 3... compressed air coming from the distributor and blow-off device 13 and are consequently empty of fuel. When the control lever 15 is actuated by the pilot for the purpose of starting reheat combustion, a certain delay occurs, as has been explained, between the moment when the lever 15 reaches the "reheat combustion" position and that when the fuel actually escapes from the injectors or multijet injection racks $R_1$, $R_2$, $R_3$... this being due to the time required for allowing the filling of said injectors through the medium of the pipes $CR_1$, $CR_2$, $CR_3$... The delay in injection is all the greater the higher the internal volume of these injectors and pipes and the smaller the flow of fuel escaping from the metering device 11 (which is usually at this time in the slow-running configuration) through the pipe 12. This delay in injection results in a delay in the actual ignition of the reheat combustion, which may entail detrimental consequences in the thermal behavior of the blades of the turbine 4 by reason of the fact that the ignition fuel, which generally arrives through the auxiliary injector 17 before the injectors of multijet injection racks $R_1$, $R_2$, $R_3$... actually discharge, is injected in superabundance. Moreover, this delay may constitute a drawback from the point of view of the performance of the machine propelled by the turbojet engine.

These drawbacks can be eliminated as a result of the use of the programming device for the ignition stage of the reheat combustion which will now be described in detail and which constitutes the subject of the invention.

An essential element of this programming device is a device for accelerated prefilling of at least one of the reheat-combustion injectors or multijet injection racks, such as $R_1$, with fuel from the source or pump 8, said fuel bypassing the metering device 11 for a limited time through branch pipes 18, 19 which places the source 8 in direct communication (through the medium of the distributor and blow-off device 13 and a pipe such as $CR_1$) with the injector $R_1$. The general reference 26 designates a programmer inserted in the branch pipes 18, 19. Pipes 20, 21, 22 end at or start from this programmer. The pipe 20, in which a one-way valve 23 is inserted, and the pipe 21 join to form a common pipe 24 connected to the suction pipe 9 of the main pump 8. As regards the pipe 22, this is connected through the medium of a one-way valve 25 to the auxiliary injector 17 for ignition fuel. A supplementary pipe 58, to which reference will be made in connection with FIGS. 10 to 16, may also be provided.

Figure 2:
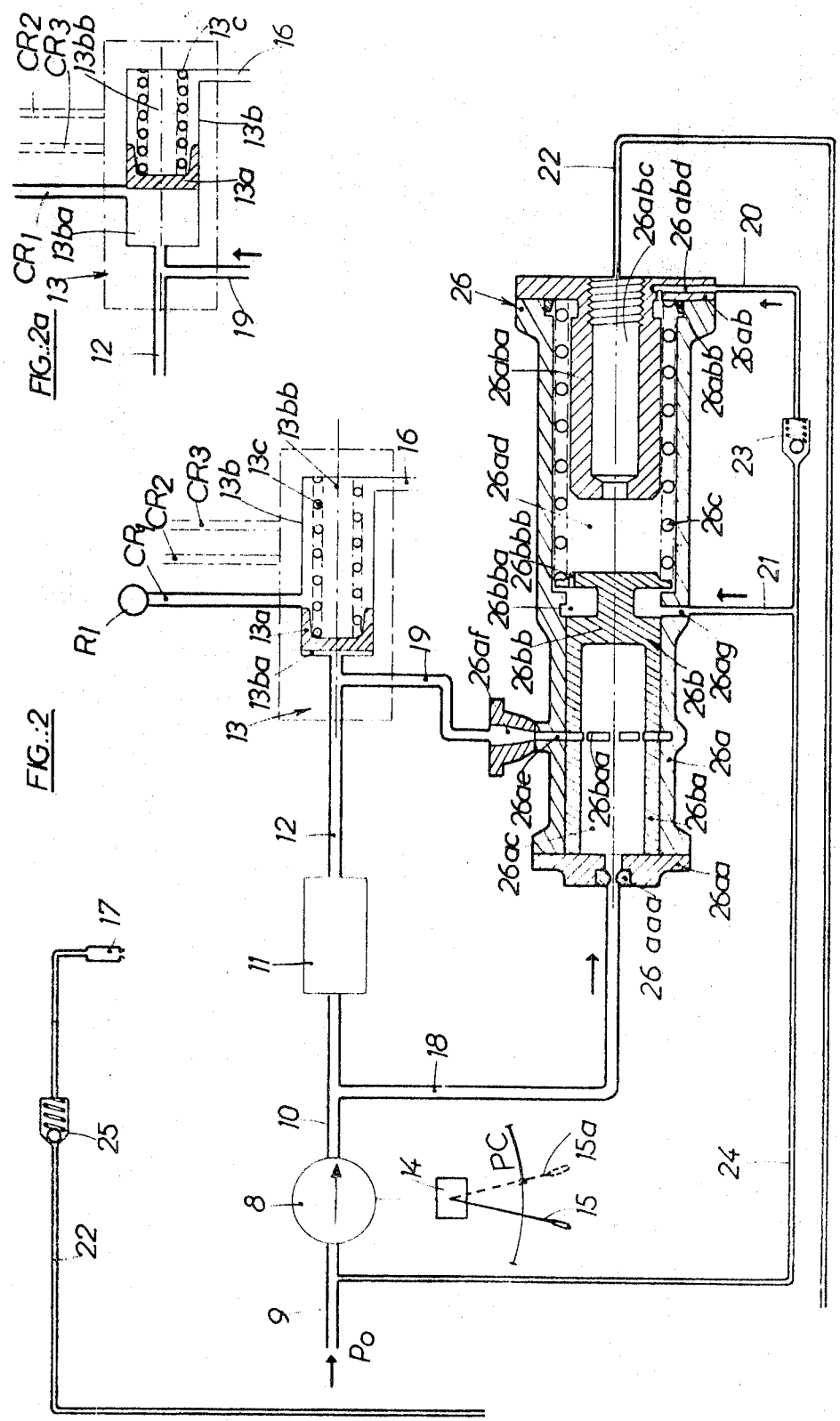
FIG. 2a is a view of a detail of FIG. 2, in the configuration of accelerated prefilling.
Figure 3:
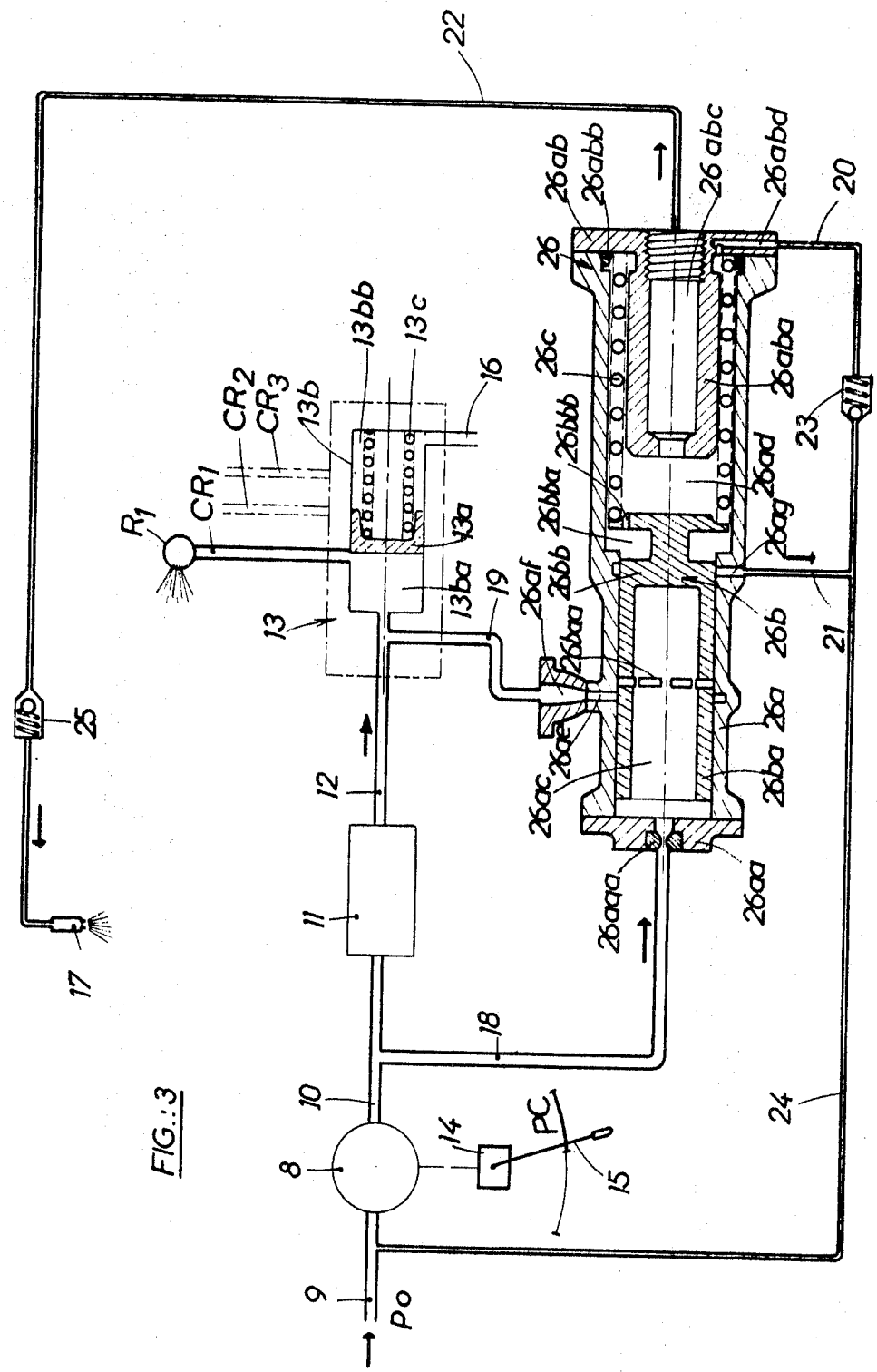
Figure 4:
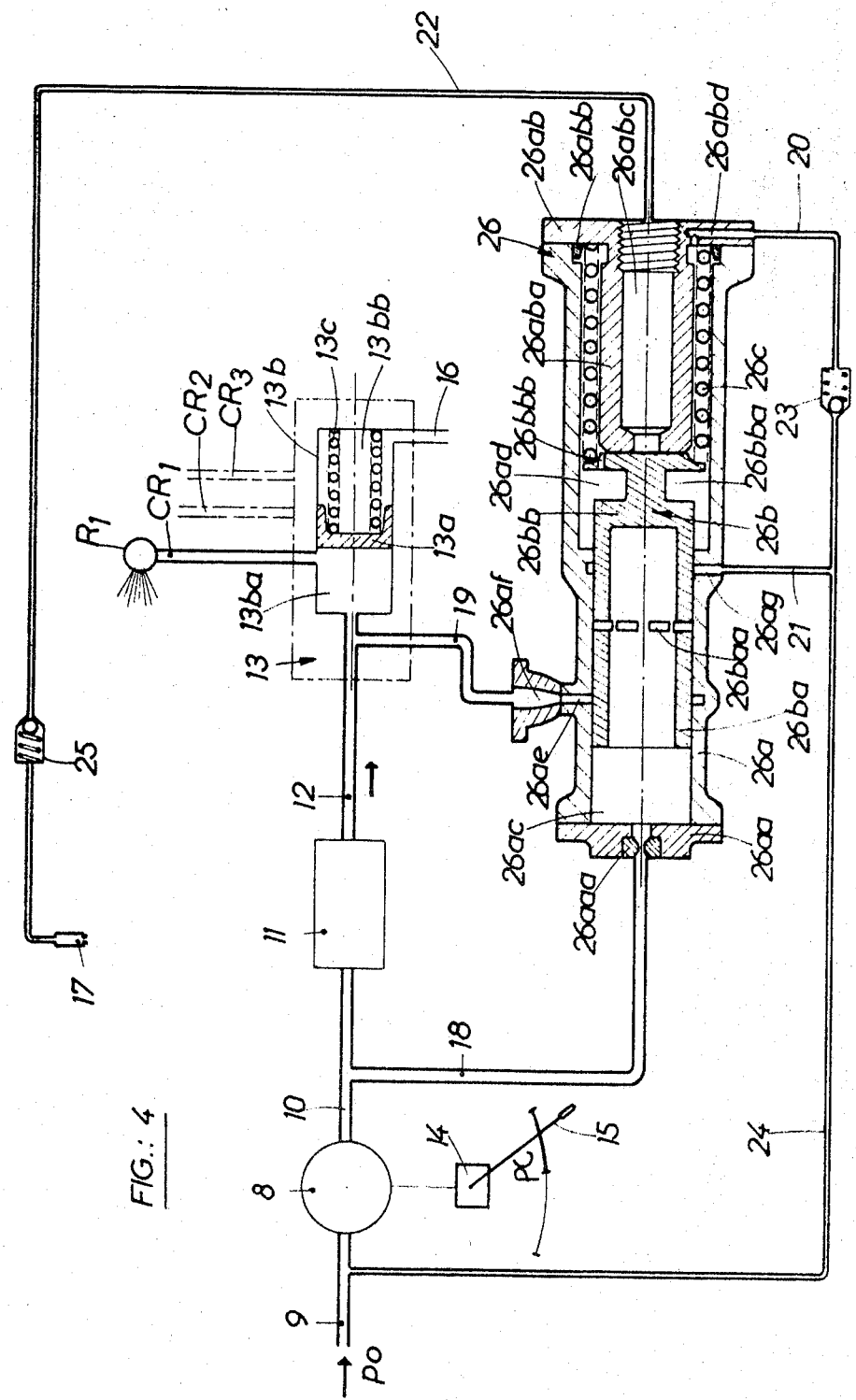

The programming device is shown on a larger scale in FIGS. 2, 3 and 4 in three different configurations. Referring to these drawings, the programmer 26 at which there end or from which there start the pipes 18, 19, 20, 21, 22 can be recognized This programmer comprises in particular a stepped cylinder 26a closed at its two ends by covers 26aa and 26ab and in which there can slide a movable body 26b integral with a piston 26bb separating two spaces 26ac and 26ad from one another. The cover 26aa is flat, while the cover 26ab forms a hollow cylinder 26aba which projects into the space 26ad and serves as a guide for a spring 26c housed in the space 26ad and bearing, on the one hand, on said cover and, on the other hand, on a movable body 26b. The references 26abb designates a packing. The space 26ac communicates with the pipe element 18, preferably through the medium of a constriction 26aaa formed in the cover 26aa, so that the movable body 26b can be subjected in one direction to the action of the fuel pressure prevailing in said pipe, the spring 26c exerting a restoring force in the other direction on said body.

When the action of the fuel pressure prevailing in the pipe 18 on the movable body is insufficient to overcome the action of the restoring force due to the spring, the movable body occupies an extreme position, shown in FIG. 2, in which it is applied against the cover 26aa. When, on the other hand, the action of said pressure becomes predominant, the movable body moves so as to occupy a second extreme position, shown in FIG. 4, in which it is applied against the part 26aba of the cover 26ab which projects into the space 26ad, FIG. 3 showing an intermediate position of said body. The movable body 26b thus constitutes a means sensitive to the pressure of the fuel in the branch pipe.

The direct communication through the medium of the branch pipe 18, 19 between the pump 8 and a reheat combustion injector or multijet injection rack, such as $R_1$, can be interrupted by a shutoff device enabling the pipes 18 and 19 to be isolated from one another. This shutoff device comprises a movable element 26ba constituted by a hollow slide valve integral with the movable body 26b, the cavity of said slide valve communicating with the space 26ac Through the hollow slide valve 26ba there extend ports 26baa beginning in the cavity of the slide valve and which in the configuration shown in FIG. 2, are disposed opposite an annular header 26ae formed in the cylinder 26a and opening through a nozzle 26af into the pipe 19.

When the movable body 26b is in its position shown in FIG. 2, the pipes 18 and 19 intercommunicate through the medium of the elements 26aaa, 26ac, 26baa, 26ae 26af, so that the regulator 11 is short-circuited by the branch pipes 18, 19, which thus place the pump 8 and an injector or multijet injection rack such as $R_1$ in direct communication. When the pressure in the branch pipe 18, 19 exceeds a predetermined value, the movable body is displaced to occupy the position shown in FIGS. 3 and 4. The ports 26baa then case to be opposite the header 26ae, so that said direct is interrupted.

The space 26ad situated to the right of the movable body 26b in the drawing constitutes the chamber of an injection pump of the piston and cylinder type, the movable member of which is formed by the piston 26bb integral with the movable body. Through the medium of a bore 26abc formed through the cover 26ab, the chamber 26ad communicates with the pipe 22 to form a delivery pipe opening into the auxiliary ignition injector 17; said chamber also communicates, through the medium of a nozzle 26abd and of the pipe 20 to form an inlet pipe, with a low-pressure fuel source, for example the suction pipe 9 of the main pump 8.

The piston 26bb has an annular groove 26bba and orifices 26bbb causing this groove to communicate with the space 26ad. In the position shown in FIG. 2, the annular groove 26bba is opposite a transverse passage 26ag formed through the wall of the cylinder 26a and communicating through the pipe 21 with the inlet pipe 20. 24 of the injection pump. When the movable body is displaced from this position towards the right (in the drawings), the piston 26bb, during a first part of its delivery stroke, returns the fuel contained in the chamber 26ad towards the inlet pipe 20. 24 of the injection pump through the orifices 26bbb, the groove 26bba, the passage 26ag and the pipe 21, until the moment when the groove 26bba of the piston has moved beyond the location of the transverse passage 26ag during its relative moment with respect to the cylinder. The relative locations of the header 26ae and the transverse passage 26ag can be determined in advance in such manner that when the movable body 26b is displaced to the right (in the drawings) said header and said transverse passage are covered simultaneously, as shown in particular in FIG. 3, so that the closing of the branch pipes 18, 19 bypassing the regulator 11 and of the return duct formed by the transverse passage 26ag and the pipe 21 are simultaneous. Likewise, the reopening of the branch pipe 18, 19 and that of the return duct 26ag–21 can be effected simultaneously on the return of the movable body to its position shown in FIG. 2.

The distributor and blow-off device 13, which is shown in detail in FIG. 2 only as regards the feed or the clearing of a single reheat combustion injector or multijet injection rack, such as $R_1$, comprises in particular a movable member 13a, in the present case a free two-position piston, placing the pipe $CR_1$ and therefore the injector $R_1$, in communication selectively with the reheat combustion fuel pipe 12 or with the compressed air pipe 16, according to whether the reheat combustion device is in operation or not. Said piston is mounted in a cavity 13b forming a widened portion of the fuel pipe 12 at a point of said pipe which is located downstream of the point where the branch pipes 18, 19 open into said fuel pipe, and it divides this cavity into two chambers 13ba and 13bb into which the fuel pipe 12 and the compressed air pipe 16 respectively open, a spring 13c also being mounted in the chamber 13bb. The piston 13a is therefore subjected to the opposed actions of the pressure of the reheat combustion fuel on the one hand, and of the pressure of the compressed air and the spring 13c on the other hand, so as to occupy one or the other of its extreme positions, which can be seen in FIGS. 2 and 3, respectively, according to whether one or the other of said actions is predominant.

The programming device operates in the following manner:

When the jet engine is working without reheat combustion, the various parts described hereinbefore are in the position shown in FIG. 2. The main pump 8 is out of action. The conduits, pipes or spaces 10, 12, 13ba, 18, 26ac, 19, 20, 21, 22 (as far as the valve 25), 24, 26ad are filled with fuel at a low or zero pressure $p_o$ prevailing in the suction pipe 9 of the pump 8. The fuel pressures on either side of the movable body 26b being equal, said movable body is pushed back to the left (in the drawings) by the spring 26c and abuts against the cover 26aa. Likewise, the spring 13c of the distributor and blow-off valve 13 pushes the piston 13a back to the left (in the drawings), so that the reheat-combustion injector or multijet injection rack $R_1$, swept by the compressed air coming from the pipe 16, is cleared of fuel. The branch pipes 18, 19 are open, like the return conduit 26ag, 21.

When the pilot wishes to start up the reheat combustion, he shifts the control lever 15 until it comes to occupy a position 15a in which the main reheat combustion pump 8 is set in operation. The fuel delivered under pressure by the pump 8 arrives in the chamber 13ba, passing through the branch pipes 18, 19, and pushes the piston 13a to the right (in the drawing), into its other position, shown in FIG 2a, in which it places the reheat combustion injector or multijet injection rack $R_1$ in communication with the chamber 13ba. The flow of fuel at high pressure then very rapidly expels the air or gases contained in the pipe $CR_1$ and the injector or injection rack $R_1$, so that the latter undergoes accelerated prefilling. The constriction 26aaa, the ports 26baa and the spring 26c are dimensioned in such manner that the movable body 26b remains abutting against the cover 26aa in spite of the pressure prevailing in the chamber 26ac.

When the injector or injection rack $R_1$ is completely filled (which is effected with extreme rapidity, since the flow-metering device 11 is short-circuited), fuel, and no longer air or gas, begins to issue through the injection orifice or orifices of the injector or injection rack. The fluid injected therefore sharply changes its nature and viscosity, so that the coefficient of flow of the injector or tube decreases sharply to a considerable extent. The fuel pressure then rises instantaneously in the circuit 18–26ac, 19, $R_1$, so that the movable body 26b begins to shift to the right (in the drawing) in opposition to the action of the spring 26c.

The "accelerated prefilling" function is terminated as soon as the ports 26baa are no longer opposite the header 26ae. The flow of fuel into the reheat combustion injector is them taken up by the metering device 11.

The movement of the movable body 26b moreover controls the start of the operation of the ignition-fuel injection pump.

As has already been explained hereinbefore, it is preferable to avoid the ignition occurring at the pressure peak produced at the end of the prefilling of the reheat combustion injector or injection rack and, consequently, to delay the start of the injection of fuel by the ignition injector 17 slightly until the prefilling flow of the reheat combustion injector has been completely cut off, once said injector has been previously completely filled during the period which has just been described.

To this end, during that displacement of the movable body which corresponds to a stroke equal to the width of the ports 26baa, the fuel filling the chamber 26ad of the injection pump is evacuated through the orifice 26bbb, the groover 26bba, the transverse passage 26ag and the pipe 21 towards the inlet pipe of the pump, in which the pressure $p_o$ prevails. The pressure in the chamber 26ad is then insufficient for the valve 25 to be able to open.

As the stroke of the movable body is continued to the right, communication between the annular groove 26bba and the transverse passage 26ag is interrupted at the moment (see FIG. 3) when the ports 26baa themselves cease to be opposite the header 26ae, that is to say at the moment when the prefilling flow short-circuiting the regulator 11 is cut off. The pressure then rises in turn in the chamber 26ad, the valve 25 opens and the auxiliary injector 17 discharges a spray of ignition fuel into the main combustion chamber of the jet engine. At the same time, the reheat combustion injector or injection rack $R_1$ begins to supply under normal pressure a quantity of fuel corresponding to the slow-running flow determined by the regulator 11.

The piston 26bb of the injection pump continues to move, delivering to the auxiliary injector 17, through the pipe 22, the flow of fuel necessary of producing, through the blades of the turbine 4, a tongue of flame having the desired characteristics. The ignition of the reheat combustion then occurs instantaneously under the best conditions.

When the piston 26bb comes into contact with the projecting portion 26aba of the cover 26ab, the amount of fuel intended for ignition is fully injected. The programming device is them in the position shown in FIG. 4, which corresponds to the operation of the turbojet engine in the reheat combustion configuration. The fuel remaining in the spaces located to the right of the piston 26bb then falls back to the pressure $p_o$ transmitted by the suction pipe 20—24.

The return of the control lever 15 to the position of operation without reheat combustion produces stopping of the main reheat combustion pump 8. The pressure in the pipe 10 then drops back to the value $p_o$ and this causes, on the one hand, the return of the movable body 26b to abut against the cover 26aa under the action of the spring 26c and, on the other hand, the return of the piston 13a of the distributor and blowoff device 13 to the left under the action of the spring 13c and, consequently, the clearing of the reheat-combustion injectors or multijet injection racks by scavenging by means of air coming from the pipe 16. The chamber 26ad fills with fuel at the pressure $p_o$ through the medium of the pipes 24, 20, 21, so that the ignition-fuel injection pump again is made ready for a fresh ignition operation.

Figure 5:
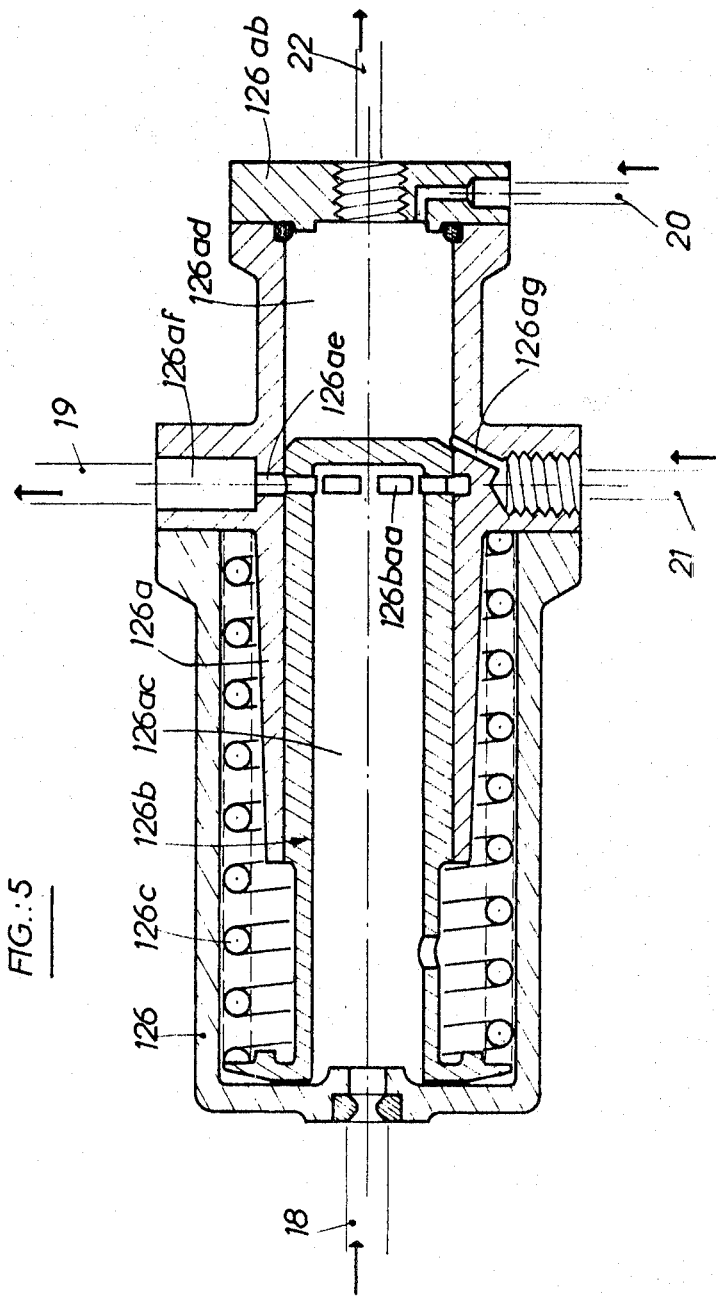
FIG. 5 is a view of a modified constructional form of a part of the device shown in FIG. 2 in the configuration of operation without reheat combustion.

FIG. 5 shows a programmer 126 differing from the programmer 26 hereinbefore described only in a few constructional details. As before, this programmer comprises a cylinder 126a in which there can slide a movable body 126b subjected to the opposed actions of the pressure of the fuel in the branch pipe 18 and of a return spring 126c. This movable body separates two spices 126ac and 126ad from one another, the first of these spaces being in communication with the branch pipe 18 and the second forming the chamber of an injection pump equipped with an inlet pipe 20 and a delivery pipe 22 for ignition fuel. The chamber 126ad is closed by a flat cover 126ab, which consequently does not have a projecting portion like the cover 26ab.

Ports 126baa, a header 126ae, a nozzle 126af and a transverse passage 126ag, respectively similar to the corresponding elements 26baa, 26ae, 26af and 26ag, are also provided. The movable body does not include an annular groove similar to the groove 26bba and the spring 126c is outside the injection pump proper.

Figure 6:
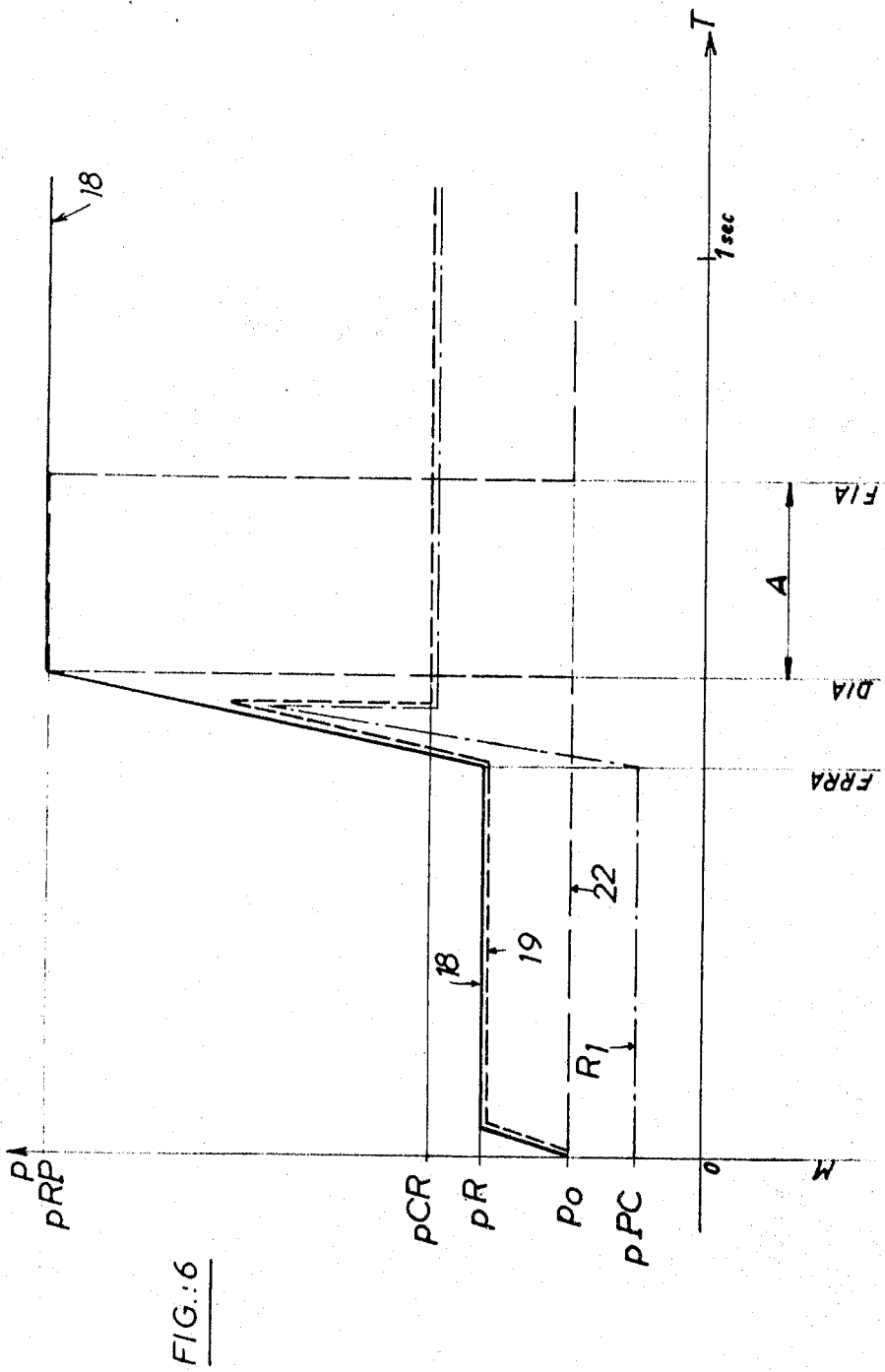
FIG. 6 is a diagram showing the development, as a function of time, of the pressure of the fuel at different points of the programming device shown in FIGS. 2 to 5.

FIG. 6 is a diagram showing the development, as a function of time, of the pressure of the fuel at different points of the programming device described with reference to FIGS. 2 to 5. The following times are shown:

M : control lever 15 placed in "reheat combustion" position (origin of the times);

FRRA : end of filling of a reheat-combustion injector or multijet injection rack such as $R_1$;

DIA : beginning of ignition injection through the auxiliary injector 17;

FIA : end of the ignition injection.

The following pressures are also shown:

$P^{PC}$ : pressure of the gas in the reheat combustion chamber;

$p_o$ : pressure of the fuel on the suction side of the main reheat combustion pump 8;

$P^R$ : accelerated prefilling pressure of a reheat combustion injector or multijet injection racks;

$P^{CR}$ : pressure of the fuel during reheat combustion slow-running;

$P^{RPg}$: pressure on the delivery side of the main reheat combustion pump 8.

Plotted in FIG. 6 are the curves representing the development, as a function of time, of the pressures prevailing in the following parts:

18 : pressure in the element 18 of the branch pipe connecting the pump 8 to the programmer 26; 19 : pressure in the element 19 of the branch pipe connecting the programmer 26 to the distributor and blowoff valve 13;

$R_1$: pressure in the reheat-combustion injector or multijet injection rack $R_1$;

22 : injection pressure of the ignition fuel.

The pressure peak which immediately follows the end of the filling of the reheat-combustion injector or tube will be noted. The duration of the spraying of the ignition fuel through the auxiliary injector 17 is designated by the reference A.

Figure 7:
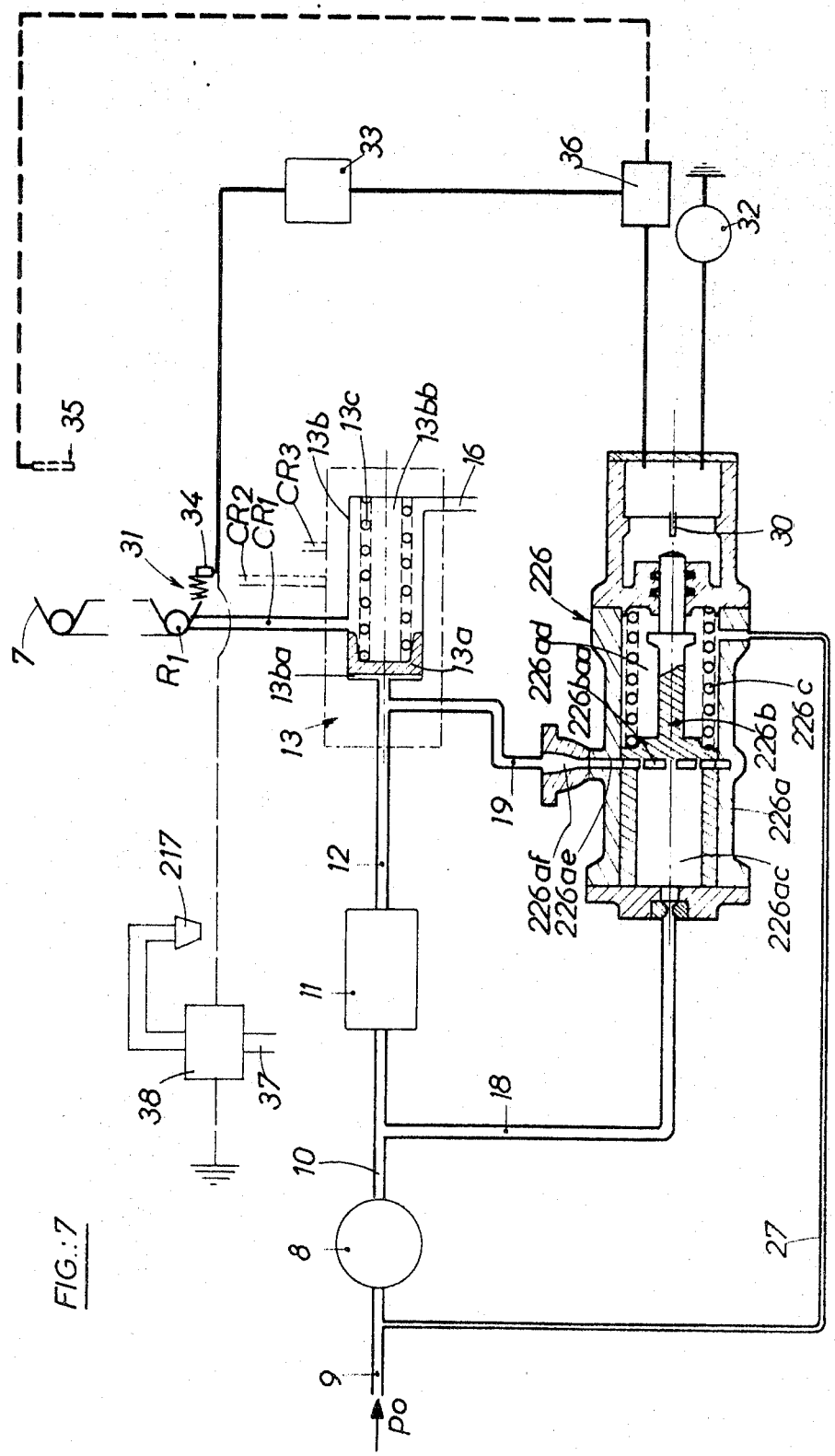
FIG. 7 is a view similar to FIG. 2 showing a second constructional form of a programming device according to the invention, said device cooperating either with an auxiliary ignition injector or with an electric igniter.

FIG. 7 illustrates another constructional form of the invention showing a programming device 226 similar, as regards the accelerated prefilling of the reheat-combustion injector or injectors, to the device 26, the elements 226a, 226b, 226c, 226ac, 226ae, 226af, 226baa being respectively similar to the elements 26a, 26b, 26c, 26ac, 26ae, 26af, 26baa previously described. As before, the movable body defines a space 226ac connected to the pipe 18, and a space 226ad. The latter is in communication by way of a piper conduit 27 with the suction pipe 9 of the main pump 8, in which the pressure $p_o$ prevails. According to this constructional form, the movable body 226b does not cooperate with an injection pump, like the movable body 26b, but with an electric contactor 30.

The electric contactor forms part of an electric circuit comprising, in particular, an electric igniter 31 which may be, as shown, of the spark type, or alternatively of the incandescent filament type. In the example shown, the electric ignition circuit comprises, in addition to the contactor 30 and a certain number of insulated connecting wires, an electric power generator 32, a time switch 33, an electrode 34 mounted in the reheat combustion chamber in the vicinity of an injector or multijet injection rack $R_1$, and a flame stabilizing ring 7 forming an earth electrode.

As before, the movable body 226b is displaced to the right (in the drawing) as soon as the accelerated prefilling of the reheat combustion injector or multijet injection rack $R_1$ is finished. At a given point of its stroke, for example at the end of its stroke, it closes the contactor 30, so that a train of sparks is produced between the electrode 34 and the ring 7 and ignites the reheat combustion fuel escaping from the injector or multijet injection rack $R_1$ under the control of the regulator 11.

The time or production of sparks may be controlled either by the time switch 33 or by an ignition detector 35 projecting into the reheat combustion chamber, said detector producing the opening of a switch 36 inserted in the electric circuit as soon as the fuel escaping from the reheat-combustion injector or injectors is actually ignited.

As before, the programmer 226 ensures without loss of time the sequence: accelerated prefilling of the reheat combustion injector or multijet injection rack $R_1$, and then ignition. Safety is also ensured, since the ignition can occur only after filling of the injector or multijet injection rack $R_1$ and closing of the branch pipes 18, 19 by displacement of the movable body 26b. This ignition therefore occurs on a flow to fuel regulated for reheat combustion slow-running and not at the flow and pressure peak which appears at the end of the accelerated prefilling of the injector or multijet injection rack $R_1$.

This constructional form applies essentially to the case where the ignition of the reheat combustion by injection of fuel upstream of the turbine 4 presents risks or difficulties. Owing to the fact that in this case the movable body is not connected to an injection pump, its stroke may be smaller, so that the programmer 226 can be less bulky than the programmer 26.

According to a modified embodiment, it is possible to cause the programmer 226 to cooperate with an auxiliary injector 217 similar to the injector 17 hereinbefore described and opening, like the latter, into the main combustion chamber 3 of the jet engine upstream of the turbine 4.

The auxiliary injector 217 is then fed with fuel through a pipe 37 in which there is inserted an electric valve 38 forming part of the electric circuit hereinbefore described, said valve being energized in the direction of opening when the contactor 30 is actuated by the movable body in the course of the movement of the latter to the right (in the drawings). As in the case of spark ignition, the duration of the ignition by injection of fuel through the auxiliary injector 217 can be controlled by means of the time switch 33 and/or of the switch 36 associated with the ignition detection device 35.

FIG. 8 shows a simplified version of a programming device 326 in accordance with the invention simply comprising a device for the accelerated prefilling of a reheat combustion injector or multijet injection rack. This device is similar to the devices already described hereinbefore, in particular as regards the elements 326a, 326b, 326c, 326ac, 326ad, 326ae, 326baa, which correspond respectively to the elements 26a, 26b, 26c, 26ac, 26ad, 26ae, 26baa of the programmer 26. As before, the movable body defines a space 326ac connected to branch pipes 318, 319 and a space 326ad. The latter space communicates through the medium of a conduit 340 with the suction pipe 9 of the main pump, in which the pressure $p_o$ prevails.

In the course of the accelerated prefilling stage, the fuel bypasses the flow-metering device 11 through the medium of the branch pipe means 318, 319. At the end of the prefilling, the latter is automatically closed by displacement of the movable body 326b towards the right (in the drawing).

FIGS. 9 and 10 show two possible ways of setting up programming devices according to the invention in the case of a turbojet engine provided with a plurality of reheat combustion injectors or multijet injection racks.

In the case of FIG. 9, a single programming device 26, of the type described with reference to FIGS. 2 to 4 and comprising in particular a common branch pipe means 18, 19, ensures in sequence the accelerated prefilling in parallel of all the reheat combustion injectors or multijet injection racks $R_1$, $R_2$, $R_3$, $R_4$,... and the delivery of a spray of ignition fuel through the pipe 22.

In the case of FIG. 10, only the injector or multijet injection rack $R_1$ is associated with a complete programming device $26_1$ similar to the device 26 described with reference to FIGS. 2 to 4 and which ensures the accelerated prefilling of said injector followed by the delivery of a spray of ignition fuel through the pipe 22. As regards the injectors $R_2$, $R_3$, $R_4$,... these are associated with simplified programming devices $326_2$, $326_3$, $326_4$,... similar to the device 326 described with reference to FIG. 8 and which only ensure the accelerated prefilling of said injectors or multijet injection racks. In the case of the device $326_2$, for example, there will be recognized the branch conduit $318_2$—$319_2$ and the low-pressure conduit $340_2$. The elements $318_2$, $318_3$, $318_4$ are fed in parallel by a pipe 318 connected to the outlet of the pump 8. Likewise, the conduits $340_2$, $340_3$, $340_4$ are connected to the suction pipe 9 of the pump 8 through the medium of a common low-pressure pipe 340.

Thus, with each of the reheat combustion injectors or multijet injection racks $R_1$, $R_2$, $R_3$, $R_4$,... there is associated an individual branch pipe means $18_1$ and $19_1$, $318_2$ and $319_2$, $318_3$ and $319_3$, $318_4$ and $319_4$,... which permits the accelerated prefilling of each of said injectors. However, only the programming device $26_1$ associated with the branch conduit $18_1$—$19_1$ is provided with a movable member which controls not only the accelerated prefilling of the injector or multijet injection racks $R_1$, but also and in sequence the ignition of the fuel injected into the reheat combustion chamber.

The programming devices shown in FIGS. 11 to 17 relate to the case where, instead of the restoring force being exerted by a spring such as 26c (FIG. 1), it results from the action of a reference pressure which is a function of the flow of fuel delivered by the reheat combustion fuel pump.

Reference will first be made to FIG. 11, which shows a first constructional form of a device of this kind.

There will be recognized in this drawing the main elements which have already been described in connection with FIG. 5 and which are designated by the same references preceded by the digit 4. It will be noted, however, that the movable body 426d now forms with a piston 426db a one-piece structure forming s stepped piston. The piston 426db slides in the element 426a forming a cylinder and separates from one another a chamber 426e and a chamber 426i. Spaced stops 426dc prevent the piston 426db being applied against the end of the cylinder 426a and enable the pressure prevailing in the chamber 426e (that is to say near enough the pressure prevailing in the multijet injection racks $R_1$, $R_2$, $R_3$) to be exerted over the whole of the surface of the piston. As regards the chamber 426i, this is subjected through the pipe 58 to the pressure prevailing on the delivery side of a pump 8. It will also be observed that the powerful biassing spring 126c described with reference to FIG. 5 has been replaced by a light spring 426j designed solely, in the absence of considerable pressure in the chamber 426e, to bring the movable body back towards the left so as to ensure the resetting of the device.

The pump 8 shown in FIG. 11 is of the so-called "vapor-core" centrifugal type. It will be briefly recalled in this connection that, in such a pump, the liquid injected through a valve 8b under the control of the regulating valve to which reference has been made hereinbefore forms a ring surrounding a core 8a of vaporized liquid. It is clear, however, that a conventional centrifugal pump of a volumetric pump could also be used.

In the following:

P will denote the pressure prevailing in 426e over an area S of the movable body;

$P_{ref}$ will denote the pressure prevailing in 426i over a section (S–S) of said body (in the case of FIG. 11, this reference pressure is equal to the delivery pressure of the pump);

$P_a$ will denote the feed pressure of the pump 8 exerted in 426f over the section s.

On operation with the engine "dry," all the above-mentioned pressures are equal to the feed pressure and the movable body is in the position shown in FIG. 11.

On the starting-up of reheat combustion, the valve 8b of the vapor-core pump opens and the delivery of fuel is effected, on the one hand, through the metering device 11 (normal circuit) and, on the other hand, in parallel inside the programmer through the constriction 26g, the ports 426da, the pipe 19, the distributor and blow-off device 13 and a multijet injection rack such as $R_1$(filling circuit).

As long as the multijet injection rack is not filled, the fuel delivered only has to overcome the valve of the distributor and blow-off device. As its biassing pressure is relatively low (a little higher than the feed pressure), it follows that during the filling stage the pressure prevailing in 426 e is substantially equal to the biassing pressure of the distributor and blow-off valve, that is $P_D$.

During this filling stage, the movable body must retain in the position shown in FIG. 11.

We must therefore have the following:

$$P_{ref} \times (S-s) + P_a \times s SP \quad (1)$$

The programmer will be dimensioned so as to satisfy this condition.

At the end of the filling, the fuel strikes against the relatively small holes such as "$i$" of the multijet injection rack when it is full and, suddenly, the coefficient of flow is considerably reduced. There ensues, throughout the circuit, an instantaneous increase $\Delta P$ in the delivery pressure, so that $P_{ref}$ becomes $P_{ref}+\Delta_D$ becomes $P_D+\Delta P$.

The opposing forces acting on the movable body are then: $(P_{ref}+\Delta P) \times (S-s)$ and $(P_D+\Delta P) \times s$.

If the diaphragm 26g is determined so that the filling flow and, consequently, P are sufficiently high, the inequality (1) becomes:

$$(P_{ref}+\Delta P) \times (s-s) + P_a \times sA(P_D+\Delta P) \times S.$$

This inequality becomes inverted, since the $\Delta P$ of the first term is exerted over a smaller area then in the second. The movable body will then move and inject the contents of the space 426f into the combustion chamber 3 through the ignition injector 17.

FIG. 12 shows another constructional form the working principle of which is the same as in the previous case. The common elements or elements which are similar to those which have already been described are designated by the same references, but preceded by the digit 5. This constructional form differs from the preceding one essentially in that the movable one-piece assembly 426d—426db. is replaced by an assembly composed of two pistons 526d, 526k interconnected by linkage such as a connecting rod 526l of adjustable length with two ball-and-socket joints 526la, 526lb. The pistons slide in the elements 526a, 526b, respectively, of the fixed structure. Three chambers 526e, 526f, and 526i are thus formed. The pressure of the fuel in the multijet injection racks prevails in the chamber 526e; the reference pressure prevails in the chamber 526i and the chamber 526f constitutes the working chamber of the injection pump.

The double ball-and-socket joint arrangement enables easy and liquidtight sliding of the two pistons to be ensured in spite of any possible misalignment of the axes of the cylinders 526a and 526b. A guide finger 526m screwed into the base or end of the cylinder 526a and cooperating with a slot 526dd in the end of the piston 526d enables any rotation of the latter to be prevented in the course of its displacement.

Communication between the chamber 526e and the pipe 19 is obtained through the medium of the ports 526da and an eccentric groove of rectangular cross section 526aa milled inside the cylinder 526a (see FIG. 12a).

The pipes or conduits 20 and 21 may be interconnected with advantage by means of a conduit 59 in which a constriction 60 is provided. This arrangement enables the chamber 526f to be placed in limited communication with the suction side of the pump 8 at the end of the ignition injection, so that, in the event of leakages between the piston 526d and the cylinder 526a, the high pressure prevailing in the chamber 526e is not established in the chamber 526f, which could cause leakage at the auxiliary injector 17 via the pipe 22.

FIG. 13 shows a constructional form of the invention which is very similar to the preceding one. The common elements or the elements similar to those which have already been described are designated by the same references, but preceded by the digit 6. The essential difference from the preceding constructional form resides in the fact that communication is obtained between the chamber 626e and a relay injector such as 56 (see FIG. 1) through the medium of a port 626de extending through the skirt of the piston 626d, a groove 626ab formed in the cylinder 626a and the relay pipe 57.

As soon as the reheat combustion fuel pump 8 is started up, the fuel can thus flow towards the relay injector 56. This flow lasts throughout the period corresponding to the accelerated prefilling of the multijet injection racks $R_1$, $R_2$, $R_3$ and during at least part of the stroke of the piston 626d. At the end of the stroke of this piston, the relay injector ceases to be fed owing to the fact that the port 626de is no longer opposite the groove 626ab. As has been explained hereinbefore, this arrangement enables the action of the tongue of flame coming from the auxiliary injector 17 to be extended at the time of ignition.

A supplementary conduit 61 equipped with a constriction 62 places the pipe 57 in limited communication with the suction side of the pump 8 so as to avoid the occurrence, through the relay injector 56, of leakage similar to that to which reference has already been made in connection with FIG. 12.

Figure 14:
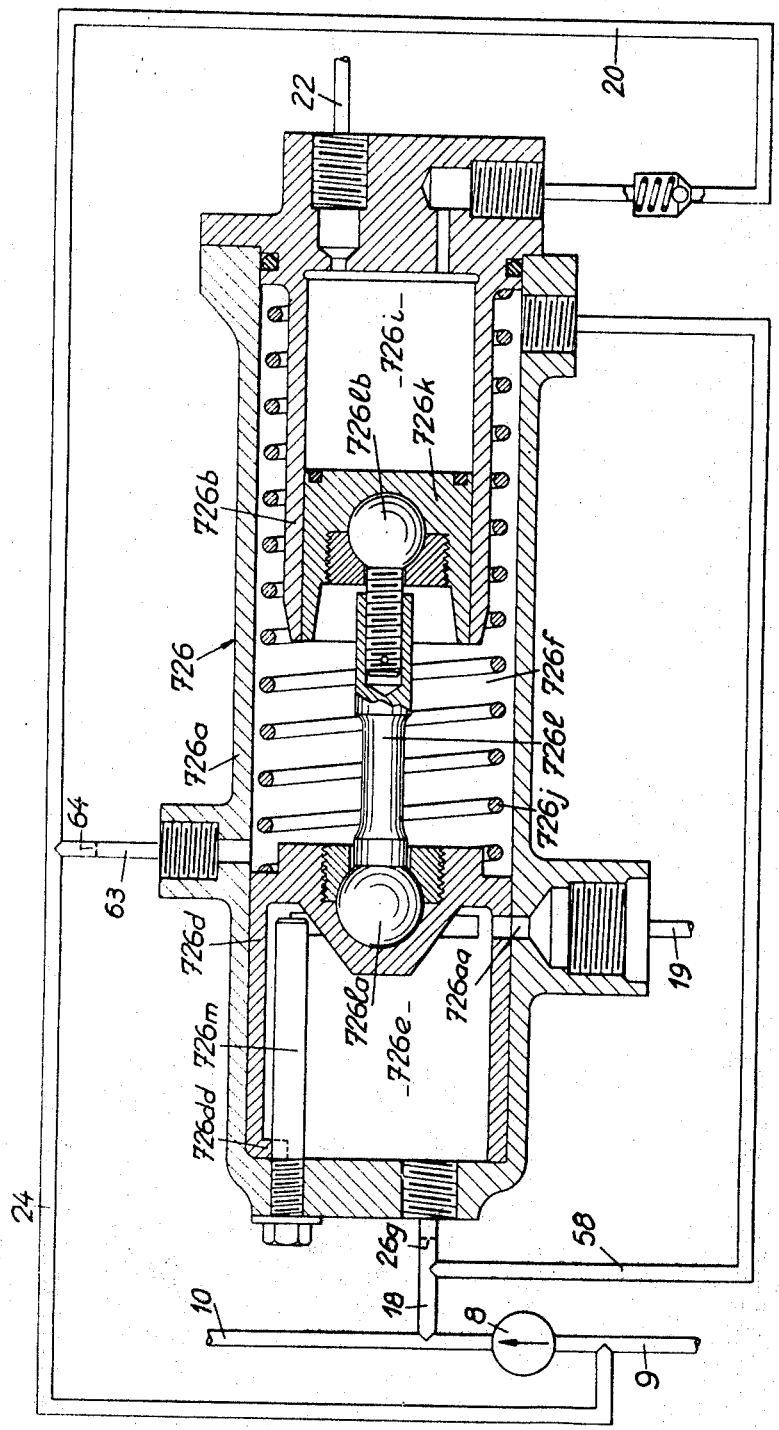

FIG. 14 shows another constructional form of a programming device 726 in accordance with the invention which is very similar to the two preceding ones. The common elements or elements similar to those which have already been described are designated by the same references preceded by the digit 7. The device 726 differs from the two preceding ones essentially in that the functions of the chambers 726f and 726i have been interchanged, the areas of action of the various pressures having been adapted accordingly. It will also be noted that the chamber 726f, in which the reference pressure prevails, is placed in communication with the suction side of the pump 8 through the medium of a conduit 63 equipped with a constriction 64, thus enabling a certain recirculation of the fuel to be ensured on the starting of the pump 8.

Figure 15:
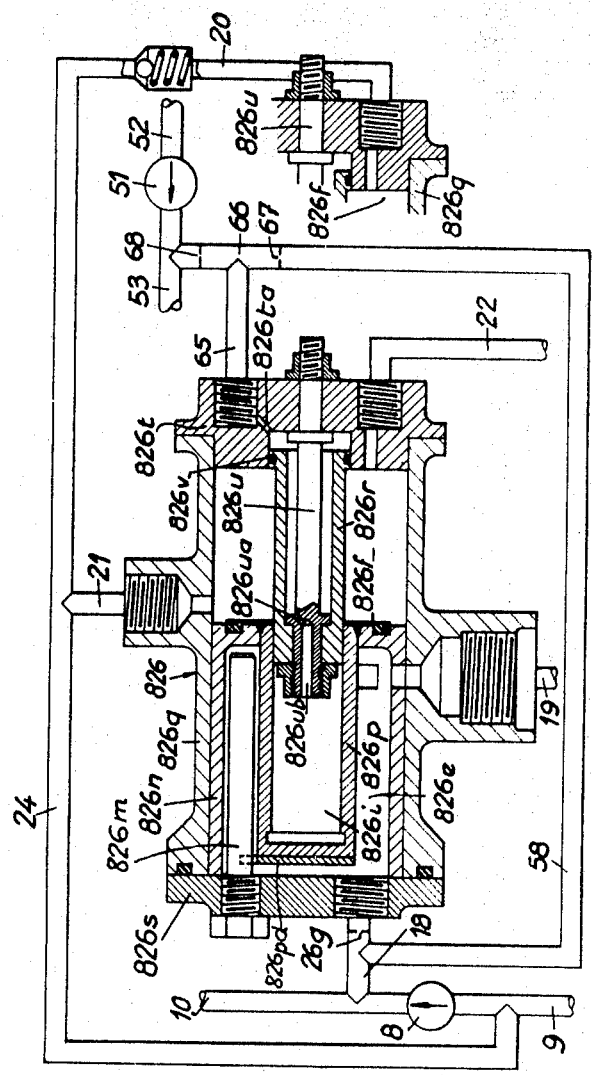

FIG. 15 shows another constructional form of a programming device 826 in accordance with the invention in which the movable body assembly comprises a stepped single-piece structure forming a piston 826n at its periphery and a cylinder 826p in the vicinity of its axis. The piston 826n cooperates with a cylinder 826q in the vicinity of fast with a fixed structure also comprising a fixed hollow piston 826r cooperating with the movable cylinder 826p, and this enables three chambers 826e, 826f and 826i to be defined. As before, the chamber, 826e is subjected to the pressure P prevailing in the multijet injection racks $R_1$, $R_2$, $R_3$, the chamber 826i is subjected to the reference pressure $P_{ref}$ and the chamber 826f constitutes the working chamber of the ignition-fuel injection pump.

The movable body is rigid with a part 826pd having a slot cooperating with the finger 826m in order, as before, to prevent any rotation of said body. The cylinder 826q is closed by two covers or end walls 826s and 826t. Fixed to the latter is a flexible rod 826u supporting the hollow piston 826r at its end. The reference pressure originating from a conduit 65 reaches as far as the chamber 826i by way of a passage 826ta formed through the cover 826t, the annular space between the rod 826u and the inside of the hollow piston 826r, and passages 826ua and 826ub formed in the rod 826u. This arrangement enables easy sliding of the cylinder 826p on the hollow piston 826r to be ensured and possible misalignment of axes to be compensated for, while maintaining good liquid-tightness due to the flexibility of the rod 826u and the presence of a packing 826v eliminating misalignment of axes or offcentering movements.

The filling of the chamber 826f on resetting is ensured by the conduit 20, the inlet of which to said chamber is offset angularly with respect to the point where the delivery pipe 22 opens, as shown by the portion located on the right of FIG. 15.

Contrary to what is provided in the preceding constructional forms, the reference pressure is not only a function of the delivery pressure of the reheat combustion fuel pump 8, but also of the delivery pressure of the pump 51 feeding the main combustion chamber of the jet engine. To this end, the reference pressure is taken, through the medium of the conduit 65, from a circuit 66 communicating with the delivery side of the pump 8 through the medium of a first constriction 67 and with the delivery side of the pump 51 through the medium of a second constriction 68. The reference pressure therefore has a value intermediate between these two pressures. Thus, with the delivery pressure of the pump 51 there is available a new parameter enabling the reference pressure $P_{ref}$ to be adjusted better to requirements. Moreover, the fact that the pump 51 is always in action enables a minimum reference pressure to be produced and, in a "dry" operation period, this keeps the programming device in the set position and ready to operate to ensure the ignition of the reheat combustion. A resetting spring, such as the spring 426$j$ (FIG. 11), therefore becomes completely unnecessary.

FIG. 16 shows, as seen in partial longitudinal section, a modified constructional form of the device just previously described, according to which the hollow piston 826$r$ and the rod 826$u$ are replaced by a one-piece member 926$w$ forming a piston and pierced by suitable passages such as 926$wa$ enabling the reference pressure to be exerted in the chamber 926$i$. The other elements are exactly similar to those which have been described with reference to FIG. 15 and are designated by the same references preceded by the digit 9.

FIG. 17 shows a modified embodiment of the two devices previously described, according to which the manufacture of the various fixed or movable elements of the programmer is arranged to be sufficiently careful to make superfluous any device making up for misalignment of axes. The conduit 65 through which the reference pressure is transmitted may then be fitted directly to the base or end 1026$t$ of the cylinder 1026$q$. This base has a hollow extension 1026$x$ communicating with the chamber 1026$i$ in which the reference pressure prevails and forming a piston cooperating with the movable cylinder 1026$p$. The other elements of this device are similar to those which have been described with reference to FIG. 15 and are designated by the same references preceded by the number 10.

The various programming devices according to the invention have the essential advantage of permitting extremely rapid prefilling of the reheat-combustion injectors or multijet injection racks, which makes the response of the reheat combustion ignition to the action of the pilot on the control lever practically instantaneous. The ignition can be initiated only in sequence after the end of the prefilling and, moreover, only after the pressure and flow peak following upon the end of the prefilling. In this way, there is obtained smooth ignition of a flow of fuel normally metered at its slow-running value by the reheat combustion regulator. The injection period of the ignition fuel is very brief and this enables any over-temperature injurious to the turbine blades to be avoided.

I claim:

1. In a gas turbine power plant having a reheat combustion chamber, a fuel feed system for reheat combustion comprising:
   a reheat-combustion fuel pump;
   fuel injector means mounted in the reheat combustion chamber;
   a feed pipe interconnecting said pump and said injector means;
   a fuel-metering device connected in said feed pipe;
   a fuel passage means connected to bypass said metering device;
   a shutoff device for said bypass means; and
   movable means responsive to the pressure of fuel prevailing in the fuel injection means to operate said shutoff device to close the bypass means when said fuel pressure exceeds a predetermined value.

2. A fuel feed system according to claim 1, wherein said shutoff device comprises a movable valve element and said last-recited means comprises means movable in one direction in response to said prevailing fuel pressure and in the opposite direction in response to a restoring force which sets said predetermined pressure value, said movable means and said movable valve element being connected for interdependent movement.

3. A fuel feed system according to claim 2, including an ignition device for the fuel injected into the reheat combustion chamber, and means whereby said ignition device is rendered operable by the movement of said movable means.

4. A fuel feed system according to claim 3, wherein said ignition device comprises a device for injecting fuel through at least one auxiliary ignition injector.

5. A fuel feed system according to claim 4, wherein the auxiliary ignition injector opens into a combustion chamber located upstream of the turbine.

6. A fuel feed system according to claim 5, wherein said ignition device comprises an injection pump of the piston and cylinder-type fed with fuel through an inlet conduit and delivering said fuel through the auxiliary ignition injector, the movable member of the injection pump being rigid with said movable means.

7. A fuel feed system according to claim 6, wherein the inlet conduit of the injection pump is connected to the suction side of the reheat combustion fuel pump.

8. A fuel feed system according to claim 7, wherein the injection pump includes passage means for returning the fuel which it delivers to its inlet conduit during a first portion of the delivery stroke of its movable member, corresponding to the stroke which the movable valve element performs for closing the branch pipe means.

9. A fuel feed system according to claim 8, wherein said passage means comprise a transverse passage formed through the sidewall of the cylinder of the injection pump and in communication with the inlet conduit of said pump during the first part of the delivery stroke of the movable member of said pump, said communication being interrupted as soon as the piston of said pump has passed beyond the location of said transverse passage during its relative movement with respect to the cylinder.

10. A fuel feed system according to claim 1, also comprising an ignition device comprising a cylinder and piston type injection pump and an auxiliary ignition injector, and a relay injector opening into the reheat combustion chamber and fed with fuel through a relay pipe incorporating a closure element rigid with the movable means, said closure element being arranged in such manner as to cause closure of the relay pipe during at least the end portion of the delivery stroke of the movable member of the ignition-fuel injection pump.

11. A fuel feed system according to claim 10, wherein said relay injector is fed with fuel taken from the branch pipe means upstream of the valve element of the shutoff device.

12. A fuel feed system according to claim 1, also comprising an ignition device for injecting fuel through an auxiliary ignition injector, said device comprising an electrically operable valve in a fuel feed pipe for the auxiliary ignition injector and forming part of an electric circuit which also comprises a contactor, said contactor being controlled by the movable means in the course of its movement under the action of the pressure of the fuel prevailing in the injector or injectors in such manner as to permit the energization of the valve in the direction of opening thereof.

13. A fuel feed system according to claim 12, wherein said electric circuit includes a time switch opening said circuit after a given lapse of time.

14. A fuel feed system according to claim 13, wherein the electric circuit includes a switch controlled by an ignition detector projecting into the reheat combustion chamber and opening said circuit when ignition is effected.

15. A fuel feed system according to claim 1, also comprising an electric igniter in an electric circuit also comprising a contactor, said contactor being controlled by the movable means on its movement under the action of the pressure of the fuel prevailing in the injector means so as to put said igniter into operation.

16. A fuel feed system according to claim 1, wherein the fuel injector means comprises a plurality of fuel injectors and the bypass means comprises a passage means for each said injector.

17. A fuel feed system according to claim 6, including a spring providing said restoring force, said spring being located outside said injection pump.

18. A fuel feed system according to claim 2, including means whereby said restoring force is at least in part derived from the fuel pressure prevailing at the delivery side of the reheat combustion fuel pump.

19. A fuel feed system according to claim 18, including a pump for feeding fuel to a combustion chamber located upstream of the turbine, wherein said reference pressure is taken from a circuit communicating with the delivery side of the reheat combustion fuel pump through the medium of a first constriction and with the delivery side of said upstream combustion chamber feed pump through the medium of a second constriction.

20. A fuel feed system according to claim 1, wherein said reheat combustion fuel pump is a 'vapor-core" centrifugal pump.

21. A fuel feed system according to claim 2, wherein the movable means comprises a body of which the cross section which is subjected to the action of the pressure prevailing in the fuel injector means is greater than that which is subjected to the restoring force.

22. In a gas turbine power plant having a reheat combustion chamber, a fuel feed system for reheat combustion comprising:

a reheat-combustion fuel pump;
fuel injector means mounted in the reheat combustion chamber;
a feedpipe interconnecting said pump and said injector means;
a fuel-metering device connected in said feedpipe;
a fuel passage means connected to bypass said metering device;
a shutoff device for said bypass said metering device;
a shutoff device for said bypass means;
an ignition device for fuel injected into said reheat combustion chamber, said device comprising a fuel injection pump and an auxiliary ignition injector; and
movable means responsive to the pressure of fuel prevailing in the fuel injection means to operate said shutoff device to close the bypass means when said fuel pressure exceeds a predetermined value determined by a reference pressure, said movable means comprising an assembly of pistons and cylinders rigid with one another and mounted to slide with respect to a fixed structure in such manner as to separate from one another three chambers having volumes variable according to the position of said assembly, namely a first chamber subjected to the pressure prevailing in the fuel injector or injectors, a second chamber subjected to the reference pressure and a third chamber forming the working chamber of the injection pump.

23. A fuel feed system according to claim 22, wherein said movable assembly comprises an integral structure forming a stepped piston.

24. A fuel feed system according to claim 22, wherein said movable assembly comprises a stepped integral structure forming a piston at its periphery and a cylinder in the vicinity of its axis.

25. A fuel feed system according to claim 22, in which said movable assembly comprises two piston and cylinder arrangements of differing cross sections and an articulated linkage between the movable elements of such assembly.

UNITED STATES PATENT OFFICE
CERTIFICATE OF CORRECTION

Patent No. 3,595,021           Dated July 27, 1971

Inventor(s) Roger Henri TISSIER

It is certified that error appears in the above-identified patent and that said Letters Patent are hereby corrected as shown below:

Claim 22, column 18, line 2, cancel in entirety.

Signed and sealed this 4th day of January 1972.

(SEAL)
Attest:

EDWARD M. FLETCHER, JR.
Attesting Officer

ROBERT GOTTSCHALK
Acting Commissioner of Patents